(12) United States Patent
Saito et al.

(10) Patent No.: US 8,968,598 B2
(45) Date of Patent: Mar. 3, 2015

(54) LIQUID CRYSTAL COMPOSITION AND LIQUID CRYSTAL DISPLAY DEVICE

(71) Applicants: JNC Corporation, Tokyo (JP); JNC Petrochemical Corporation, Tokyo (JP)

(72) Inventors: Masayuki Saito, Chiba (JP); Yoshinari Matsumura, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 65 days.

(21) Appl. No.: 13/813,423

(22) PCT Filed: Dec. 3, 2012

(86) PCT No.: PCT/JP2012/081239
§ 371 (c)(1),
(2) Date: Jan. 30, 2013

(87) PCT Pub. No.: WO2013/088980
PCT Pub. Date: Jun. 20, 2013

(65) Prior Publication Data
US 2014/0198291 A1 Jul. 17, 2014

(30) Foreign Application Priority Data
Dec. 14, 2011 (JP) ................. 2011-272936

(51) Int. Cl.
C09K 19/30 (2006.01)
C09K 19/12 (2006.01)
C09K 19/02 (2006.01)
C09K 19/00 (2006.01)
C09K 19/52 (2006.01)
G02F 1/1333 (2006.01)
C09K 19/06 (2006.01)
G02F 1/00 (2006.01)
C09K 19/20 (2006.01)
C09K 19/16 (2006.01)
C09K 19/32 (2006.01)
C09K 19/04 (2006.01)

(52) U.S. Cl.
CPC .............. *G02F 1/0009* (2013.01); *C09K 19/20* (2013.01); *C09K 19/3066* (2013.01); *C09K 19/3068* (2013.01); *C09K 19/16* (2013.01); *C09K 19/322* (2013.01); *C09K 2019/0466* (2013.01); *C09K 2019/122* (2013.01); *C09K 2019/123* (2013.01); *C09K 2019/3004* (2013.01); *C09K 2019/3009* (2013.01); *C09K 2019/301* (2013.01); *C09K 2019/3015* (2013.01); *C09K 2019/3016* (2013.01); *C09K 2019/3021* (2013.01); *C09K 2019/3025* (2013.01); *C09K 2019/3071* (2013.01); *C09K 2019/3078* (2013.01); *C09K 2019/161* (2013.01)
USPC .............. 252/299.63; 252/299.66; 252/299.6; 349/183; 349/86; 428/1.1; 428/1.3

(58) Field of Classification Search
USPC .............. 252/299.01, 299.6, 299.63, 299.66; 428/1.1, 1.3; 349/86, 183, 187
See application file for complete search history.

(56) References Cited

U.S. PATENT DOCUMENTS 7,709,066 B2 * 5/2010 Matsumura et al. ........... 428/1.1
8,366,964 B2 * 2/2013 Maeda et al. ............ 252/299.63
8,642,142 B2 * 2/2014 Hattori et al. .................. 428/1.1

FOREIGN PATENT DOCUMENTS

| | | |
|---|---|---|
| JP | 2006-502264 | 1/2006 |
| JP | 2006-089622 | 4/2006 |
| JP | 2009-067780 | 4/2009 |
| JP | 2009-084560 | 4/2009 |
| JP | 2011-525553 | 9/2011 |
| JP | 2011-231197 | 11/2011 |
| JP | 2012-219270 | 11/2012 |
| WO | 2009139330 | 11/2009 |
| WO | 2010089092 | 8/2010 |
| WO | 2010134430 | 11/2010 |
| WO | 2011162142 | 12/2011 |

OTHER PUBLICATIONS

"International Search Report (Form PCT/ISA/210)", mailed on Feb. 19, 2013, p. 1-p. 4.
"Written Opinion of the International Search Authority (PCT/ISA/237)", mailed on Feb. 19, 2013, p. 1-p. 7.
"International Search Report (Form PCT/ISA/210)", published on Feb. 19, 2013, p. 1-p. 4.

* cited by examiner

*Primary Examiner* — Geraldina Visconti
(74) *Attorney, Agent, or Firm* — Jianq Chyun IP Office

(57) ABSTRACT

A liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light and a high stability to heat, or having a suitable balance regarding at least two of the characteristics is provided; and an AM device having a short response time, a suitable pretilt, a large voltage holding ratio, a large contrast ratio, a long service life and so forth is provided. A solution is a liquid crystal composition containing a specific compound having a high maximum temperature and a large dielectric anisotropy as a first component and a polymerizable compound as a second component, and a liquid crystal display device including the composition.

18 Claims, No Drawings

LIQUID CRYSTAL COMPOSITION AND LIQUID CRYSTAL DISPLAY DEVICE

CROSS-REFERENCE TO RELATED APPLICATION

This application is a 371 of international application of PCT application serial no. PCT/JP2012/081239, filed on Dec. 3, 2012, which claims the priority benefit of Japan application no. 2011-272936, filed on Dec. 14, 2011. The entirety of each of the above mentioned patent applications is hereby incorporated by reference herein and made a part of this specification.

TECHNICAL FIELD

The invention relates to a liquid crystal composition containing a polymerizable compound that is polymerized, for example, by light or heat. The invention also relates to a liquid crystal display device in which the liquid crystal composition is sealed between substrates, and the polymerizable compound contained in the liquid crystal composition is polymerized to immobilize alignment of liquid crystals.

As the technical field of the invention, the invention relates to a liquid crystal composition mainly suitable for use in an active matrix (AM) device and so forth, and an AM device and so forth including the composition. In particular, the invention relates to a liquid crystal composition having a positive dielectric anisotropy, and a device and so forth that include the composition and have a mode such as a twisted nematic (TN) mode, an opticallycompensatedbend (OCB) mode, an in-plane switching (IPS) mode, a fringe field switching (FFS) mode or a polymer sustained alignment (PSA) mode.

BACKGROUND ART

In a liquid crystal display device, a classification based on an operating mode for liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a polymer sustained alignment (PSA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing natural light, a transmissive type utilizing backlight and a transflective type utilizing both the natural light and the backlight.

The devices include a liquid crystal composition having suitable characteristics. The liquid crystal composition has a nematic phase. General characteristics of the composition should be improved to obtain an AM device having good general characteristics. Table 1 below summarizes a relationship of the general characteristics between two aspects. The general characteristics of the composition will be further explained based on a commercially available AM device. A temperature range of the nematic phase relates to a temperature range in which the device can be used. A preferred maximum temperature of the nematic phase is about 70° C. or higher and a preferred minimum temperature of the nematic phase is about 0° C. or lower. Viscosity of the composition relates to a response time in the device. A short response time is preferred for displaying moving images on the device. Accordingly, a small viscosity in the composition is preferred. A small viscosity at a low temperature is further preferred. An elastic constant of the composition relates to a contrast of the device. In order to increase the contrast in the device, a large elastic constant in the composition is further preferred.

TABLE 1

General Characteristics of Composition and AM Device

| No. | General Characteristics of Composition | General Characteristics of AM Device |
| --- | --- | --- |
| 1 | Wide temperature range of a nematic phase | Wide usable temperature range |
| 2 | Small viscosity [1] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |
| 7 | Large elastic constant | Short response time and large contrast ratio |

[1] A liquid crystal composition can be injected into a liquid crystal cell in a shorter period of time.

An optical anisotropy of the composition relates to a contrast ratio in the device. A product ($\Delta n \times d$) of the optical anisotropy ($\Delta n$) of the composition and a cell gap (d) in the device is designed so as to maximize the contrast ratio. A suitable value of the product depends on the type of the operating mode. The suitable value is about 0.45 micrometer in a device having a mode such as TN. In the above case, a composition having a large optical anisotropy is preferred for a device having a small cell gap. A large dielectric anisotropy in the composition contributes to a low threshold voltage, a small electric power consumption and a large contrast ratio in the device. Accordingly, the large dielectric anisotropy is preferred. A large specific resistance in the composition contributes to a large voltage holding ratio, and a large contrast ratio in the device. Accordingly, a composition having a large specific resistance at room temperature and also at a temperature close to a maximum temperature of the nematic phase in an initial stage is preferred. A composition having a large specific resistance at room temperature and also at a temperature close to the maximum temperature of the nematic phase even after the device has been used for a long period of time is preferred. Stability of the composition to ultraviolet light and heat relates to a service life of the liquid crystal display device. In the case where the stability is high, the device has a long service life. Such characteristics are preferred for an AM device for use in a liquid crystal projector, a liquid crystal television and so forth. The large elastic constant in the composition contributes to the large contrast ratio and the short response time in the device. Therefore, the large elastic constant is preferred.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode and an AM device having the FFS mode. A composition having a positive or negative dielectric anisotropy is used for an AM device having the PSA mode. Examples of the liquid crystal composition having the positive dielectric anisotropy are disclosed in Patent literature No. 1 to Patent literature No. 3 and so forth.

REFERENCE LIST

Patent Literature

Patent literature No. 1: JP 2006-502264 A.
Patent literature No. 2: WO 2010/089092 A.
Patent literature No. 3: JP 2011-525553 A.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant.

SUMMARY OF INVENTION

Technical Problem

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large dielectric anisotropy, a low threshold voltage, a large specific resistance, a high stability to ultraviolet light, a high stability to heat and a large elastic constant. Another aim is to provide a liquid crystal composition having a suitable balance regarding at least two of the characteristics. A further aim is to provide a liquid crystal display device including such a composition. An additional aim is to provide a composition having a suitable optical anisotropy, a large dielectric anisotropy, a low threshold voltage, a high stability to ultraviolet light, a large elastic constant and so forth, and an AM device having characteristics such as a short response time, a large voltage holding ratio, a large contrast ratio and a long service life.

Solution to Problem

The invention concerns a liquid crystal composition that has a nematic phase, and contains at least one compound selected from the group of compounds represented by formula (1) as a first component and at least one polymerizable compound as a second component, and has a ratio of the first component in the range of 5% by weight to 40% by weight based on the liquid crystal composition excluding the second component, and a liquid crystal display device including a liquid crystal material obtained by polymerizing the polymerizable compound in the liquid crystal composition:

wherein $R^1$ is alkyl having 1 to 12 carbons, alkoxy having 1 to 12 carbons or alkenyl having 2 to 12 carbons; ring A and ring B are independently 1,4-cyclohexylene, 1,4-phenylene, 2-fluoro-1,4-phenylene, 3-fluoro-1,4-phenylene, 3,5-difluoro-1,4-phenylene, pyrimidines-2,5-diyl or 2,6,7-trioxabicyclo[2.2.2]octane-1,4-diyl; $Z^1$ and $Z^2$ are independently a single bond, ethylene, carbonyloxy or difluoromethyleneoxy; $X^1$, $X^2$, $X^3$ and $X^4$ are independently hydrogen or fluorine; $Y^1$ is fluorine, chlorine, trifluoromethyl or trifluoromethoxy; and m and j are independently 0, 1, 2 or 3, and a sum of m and j is 2 or 3.

Advantageous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large dielectric anisotropy, a low threshold voltage, a large specific resistance, a high stability to ultraviolet light, a high stability to heat and a large elastic constant. One aspect of the invention is a liquid crystal composition having a suitable balance regarding at least two of the characteristics. Another aspect is a liquid crystal display device including such a composition. A further aspect is a composition having a large optical anisotropy, a large dielectric anisotropy, a low threshold voltage, a high stability to ultraviolet light, a large elastic constant and so forth, and is an AM device having a short response time, a large voltage holding ratio, a large contrast ratio, a long service life and so forth.

DESCRIPTION OF EMBODIMENTS

Usage of terms in the specification is as described below. A liquid crystal composition or a liquid crystal display device of the invention may be abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound may be added to the composition. Even in the case where the compounds are liquid crystalline, the compounds are classified as an additive herein. A polymerizable compound also includes a known compound having no ring. At least one compound selected from the group of compounds represented by formula (1) may be abbreviated as "compound (1)." "Compound (1)" means one compound or two or more compounds represented by formula (1). A same rule applies to any other compound represented by any other formula. An expression

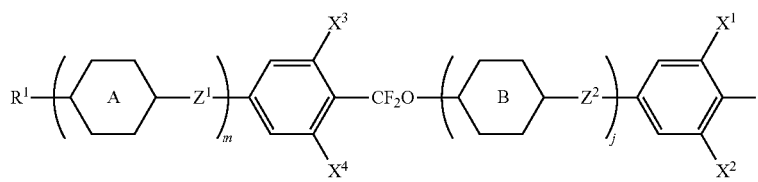

(1)

"at least one" in the context of "replaced" shows that not only a position but also the number can be freely selected.

A higher limit of a temperature range of the nematic phase may be abbreviated as "maximum temperature." A lower limit of the temperature range of the nematic phase may be abbreviated as "minimum temperature." An expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in an initial stage, and that the device has a large voltage holding ratio at room temperature and also at a temperature close to the maximum temperature of the nematic phase even after the device has been used for a long period of time. When characteristics such as an optical anisotropy are explained, values obtained according to the measuring methods described in Examples will be used. A first component includes one compound or two or more compounds. "Ratio of the first component" is expressed in terms of weight percent (% by weight) of the first component based on the weight of the liquid crystal composition excluding the second component. "Ratio of the second component" is expressed in terms of a weight ratio (part by weight) of the second component based on 100 parts by weight of the liquid crystal composition excluding the second component. "Ratio of a third component" and "ratio of a fourth component" are expressed in a manner similar to "ratio of the first component." A ratio of the additive mixed with the composition is expressed in terms of weight percent (% by weight) or weight parts per million (ppm) based on the total weight of the liquid crystal composition.

A symbol $R^1$ is used for a plurality of compounds in chemical formulas of component compounds. In the compounds, groups selected by two of arbitrary $R^1$ may be identical or different. In one case, for example, $R^1$ of compound (1) is ethyl and $R^1$ of compound (1-1) is ethyl. In another case, $R^1$ of compound (1) is ethyl and $R^1$ of compound (1-1) is propyl. A same rule also applies to a symbol $R^2$, $X^1$, $Y^1$ or the like.

The invention includes the items described below.

Item 1. A liquid crystal composition, having a nematic phase and containing at least one compound selected from the group of compounds represented by formula (1) as a first component and at least one polymerizable compound as a second component, and having a ratio of the first component in the range of 5% by weight to 40% by weight based on the weight of the liquid crystal composition excluding the second component:

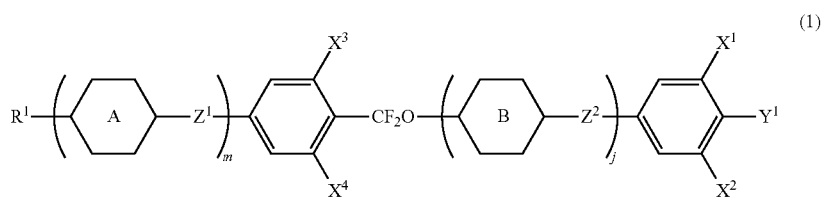

wherein $R^1$ is alkyl having 1 to 12 carbons, alkoxy having 1 to 12 carbons or alkenyl having 2 to 12 carbons; ring A and ring B are independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl or 2,6,7-trioxabicyclo[2.2.2]octane-1,4-diyl; $Z^1$ and $Z^2$ are independently a single bond, ethylene, carbonyloxy or difluoromethyleneoxy; $X^1$, $X^2$, $X^3$ and $X^4$ are independently hydrogen or fluorine; $Y^1$ is fluorine, chlorine, trifluoromethyl or trifluoromethoxy; and m and j are independently 0, 1, 2 or 3, and a sum of m and j is 2 or 3.

Item 2. The liquid crystal composition according to item 1, wherein the first component is at least one compound selected from the group of compounds represented by formula (1-1) to formula (1-10):

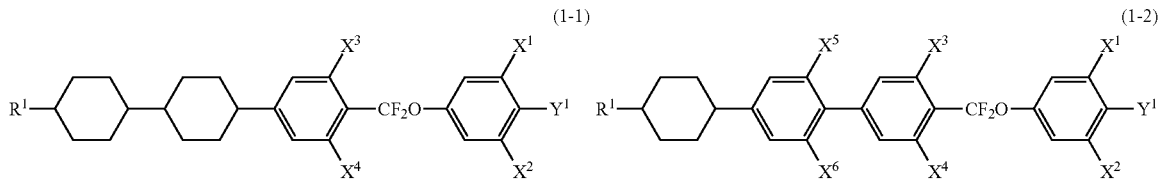

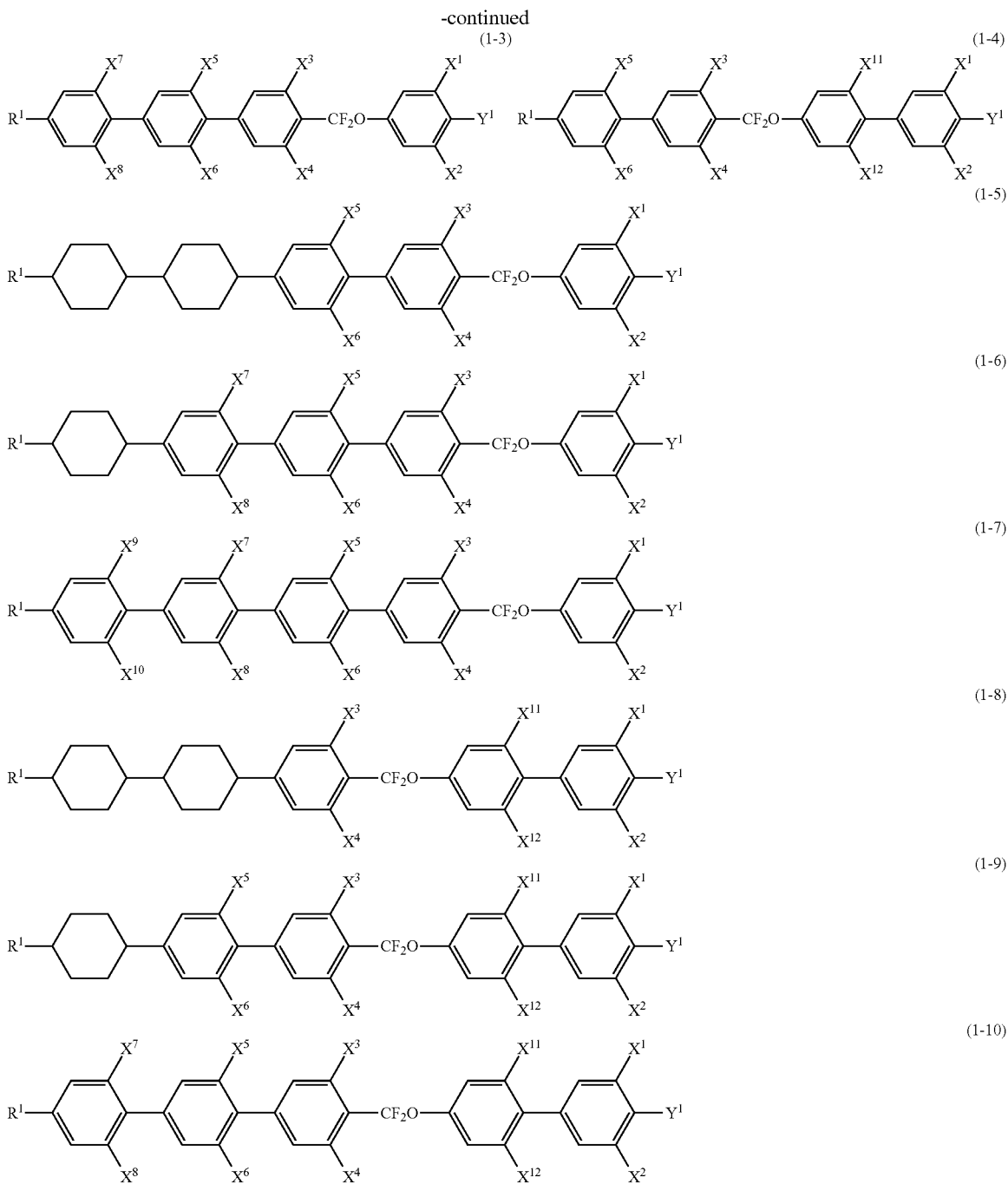

wherein $R^1$ is alkyl having 1 to 12 carbons, alkoxy having 1 to 12 carbons, or alkenyl having 2 to 12 carbons; $X^1$, $X^2$, $X^3$, $X^4$, $X^5$, $X^6$, $X^7$, $X^8$, $X^9$, $X^{10}$, $X^{11}$ and $X^{12}$ are independently hydrogen or fluorine; and $Y^1$ is fluorine, chlorine, trifluoromethyl or trifluoromethoxy.

Item 3. The liquid crystal composition according to item 1, wherein the first component is at least one compound selected from the group of compounds represented by formula (1-2) according to item 2.

Item 4. The liquid crystal composition according to item 1, wherein the first component is at least one compound selected from the group of compounds represented by formula (1-3) according to item 2.

Item 5. The liquid crystal composition according to item 1, wherein the first component is at least one compound selected from the group of compounds represented by formula (1-10) according to item 2.

Item 6. The liquid crystal composition according to item 1, wherein the first component is a mixture of at least one compound selected from the group of compounds represented by formula (1-2) according to item 2 and at least one compound selected from the group of compounds represented by formula (1-3) according to item 2.

Item 7. The liquid crystal composition according to any one of items 1 to 6, wherein the second component is at least one compound selected from the group of compounds represented by formula (2):

(2)

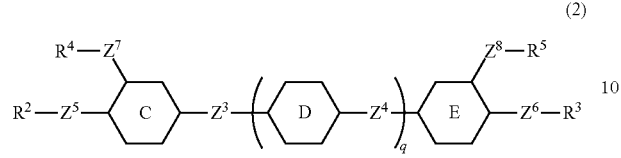

wherein $R^2$, $R^3$, $R^4$ and $R^5$ are independently hydrogen, alkyl having 1 to 12 carbons, alkoxy having 1 to 12 carbons, alkenyl having 2 to 12 carbons, alkenyl having 2 to 12 carbons in which at least one of hydrogen is replaced by fluorine, acryloyl, methacryloyl, vinyloxy, propenyloxy, oxirane, oxetane or vinylcarbonyl, and at least one of $R^2$, $R^3$, $R^4$ and $R^5$ is acryloyl, methacryloyl, vinyl, vinyloxy, propenyloxy, oxirane, oxetane or vinylcarbonyl; ring C, ring D and ring E are independently 1,4-cyclohexylene, 1,4-phenylene, 2-fluoro-1,4-phenylene, 3-fluoro-1,4-phenylene, 2,3-difluoro-1,4-phenylene, 2-methyl-1,4-phenylene, 3-methyl-1,4-phenylene, 2-trifluoromethyl-1,4-phenylene, 3-trifluoromethyl-1,4-phenylene or 2,6-naphthalene; $Z^3$ is a single bond, ethylene, methyleneoxy, carbonyloxy, —CO—$CR^6$=$CR^7$—, —$CR^6$=$CR^7$—CO—, —$CR^6$=$CR^7$—, —C(=$CR^6R^7$)— or —C(=$R^8$)—; $R^6$ and $R^7$ are independently hydrogen, halogen, alkyl having 1 to 10 carbons, or alkyl having 1 to 10 carbons in which at least one of hydrogen is replaced by fluorine; and $R^8$ is a group selected from the group of groups represented by formula (R-1);

(R-1)

wherein $V^1$ is independently halogen, alkyl having 1 to 6 carbons, or alkyl having 1 to 6 carbons in which at least one of hydrogen is replaced by fluorine; $n_1$ is an integer from 1 to 8; $n_2$ is an integer from 0 to 4; $Z^4$ is independently a single bond, ethylene, methyleneoxy or carbonyloxy; $Z^5$, $Z^6$, $Z^7$ and $Z^8$ are independently a single bond or alkylene having 1 to 12 carbons, at least one of hydrogen of the alkylene may be replaced by halogen or —C≡N, at least one of non-adjacent —$CH_2$— may be replaced by —O—, —S—, —NH—, —CO—, —CO—O—, —O—CO—, —O—CO—O—, —CH=CH—, or —C≡C—; and q is 0, 1 or 2.

Item 8. The liquid crystal composition according to item 7, wherein the second component is at least one compound selected from the group of compounds represented by formula (2-1) to formula (2-26):

(2-1)

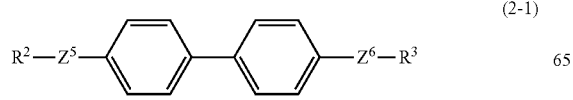

(2-2)

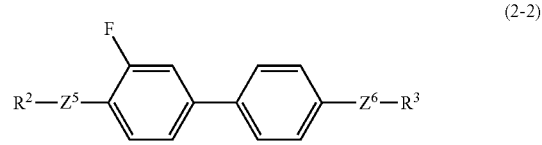

(2-3)

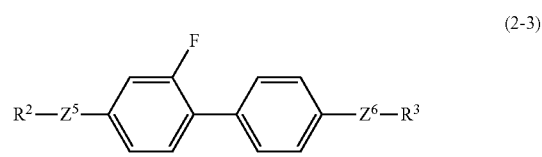

(2-4)

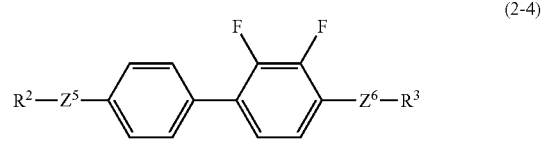

(2-5)

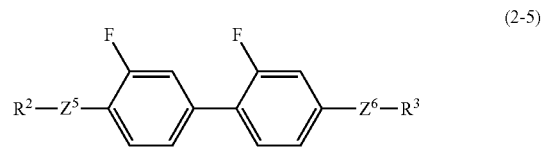

(2-6)

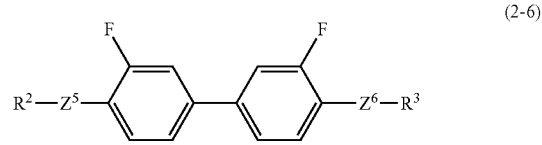

(2-7)

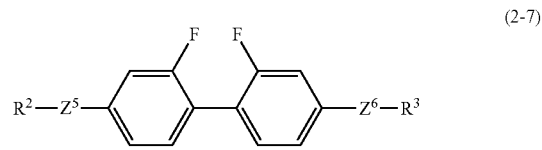

(2-8)

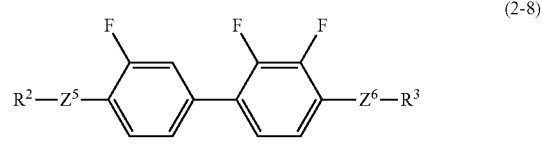

(2-9)

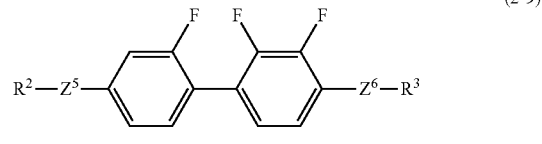

(2-10)

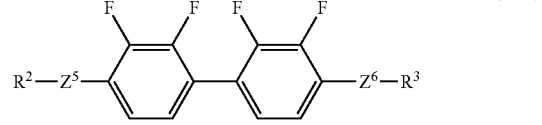

(2-11)

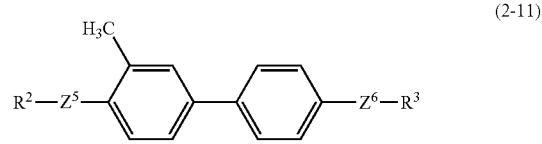

(2-12)

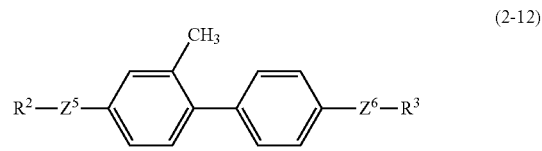

-continued (2-13) 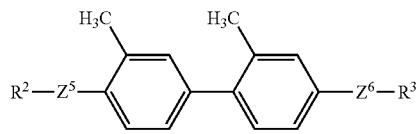

(2-14) 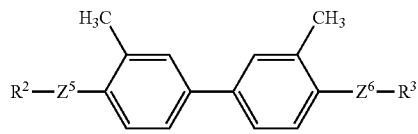

(2-15) 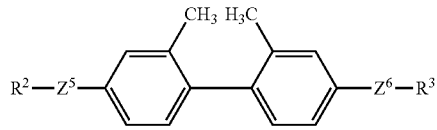

(2-16) 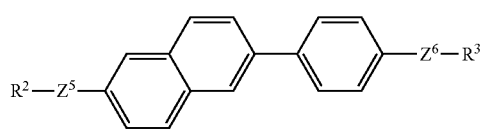

(2-17) 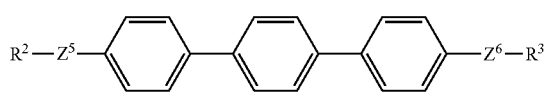

(2-18) 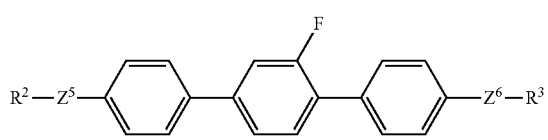

(2-19) 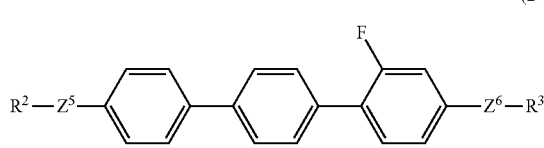

(2-20) 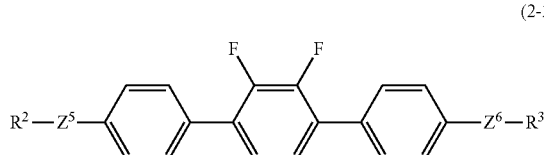

(2-21) 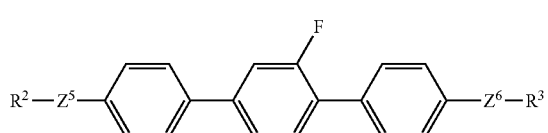

(2-22) 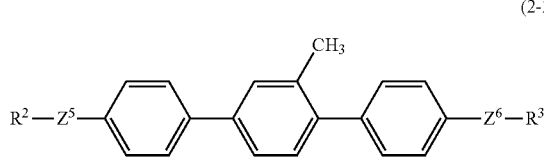

-continued (2-23) 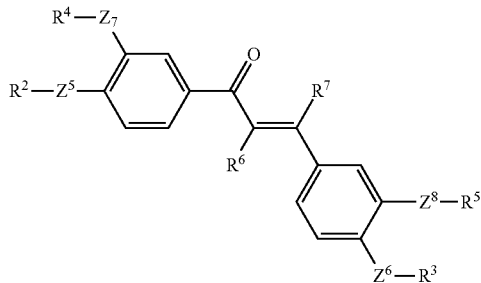

(2-24) 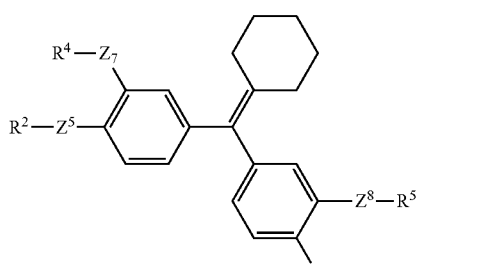

(2-25) 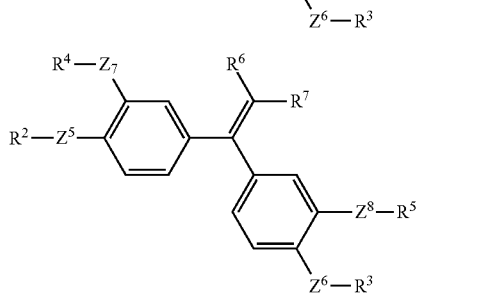

(2-26) 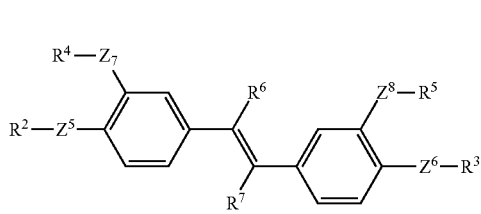

wherein $R^2$, $R^3$, $R^4$, and $R^5$ are independently hydrogen, alkyl having 1 to 12 carbons, alkoxy having 1 to 12 carbons, alkenyl having 2 to 12 carbons, alkenyl having 2 to 12 carbons in which at least one of hydrogen is replaced by fluorine, acryloyl, methacryloyl, vinyloxy, propenyloxy, oxirane, oxetane or vinylcarbonyl, at least one of $R^2$, $R^3$, $R^4$ and $R^5$ is acryloyl, methacryloyl, vinyl, vinyloxy, propenyloxy, oxirane, oxetane or vinylcarbonyl, and $R^6$ and $R^7$ are independently hydrogen, halogen, alkyl having 1 to 10 carbons, or alkyl having 1 to 10 carbons in which at least one of hydrogen is replaced by fluorine; $Z^5$, $Z^6$, $Z^7$ and $Z^8$ are independently a single bond or alkylene having 1 to 12 carbons, at least one of hydrogen of the alkylene may be replaced by halogen or —C≡N, and at least one of non-adjacent —CH$_2$— may be replaced by —O—, —S—, —NH—, —CO—, —CO—O—, —O—CO—, —O—CO—O—, —CH=CH— or —C≡C—.

Item 9. The liquid crystal composition according to item 7, wherein the second component is at least one compound selected from the group of compounds represented by formula (2-1) according to item 8.

Item 10. The liquid crystal composition according to item 7, wherein the second component is at least one compound selected from the group of compounds represented by formula (2-2) according to item 8.

Item 11. The liquid crystal composition according to item 7, wherein the second component is at least one compound selected from the group of compounds represented by formula (2-3) according to item 8.

Item 12. The liquid crystal composition according to item 7, wherein the second component is at least one compound selected from the group of compounds represented by formula (2-18) according to item 8.

Item 13. The liquid crystal composition according to item 7, wherein the second component is at least one compound selected from the group of compounds represented by formula (2-23) according to item 8.

Item 14. The liquid crystal composition according to any one of items 1 to 13, wherein a ratio of the second component is in the range of 0.05 part by weight to 10 parts by weight based on 100 parts by weight of the liquid crystal composition excluding the second component.

Item 15. The liquid crystal composition according to any one of items 1 to 14, further containing at least one compound selected from the group of compounds represented by formula (3) as a third component:

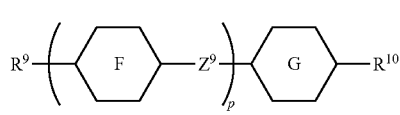
(3)

wherein $R^9$ and $R^{10}$ are independently alkyl having 1 to 12 carbons, alkoxy having 1 to 12 carbons, alkenyl having 2 to 12 carbons, alkenyl having 2 to 12 carbons in which at least one of hydrogen is replaced by fluorine; ring F and ring G are independently 1,4-cyclohexylene, 1,4-phenylene, 2-fluoro-1,4-phenylene, 3-fluoro-1,4-phenylene or 2,5-difluoro-1,4-phenylene; $Z^9$ is independently a single bond, ethylene, methyleneoxy or carbonyloxy; and p is 1, 2 or 3.

Item 16. The liquid crystal composition according to item 15, wherein the third component is at least one compound selected from the group of compounds represented by formula (3-1) to (3-13):

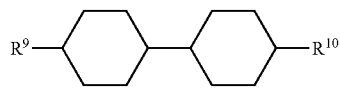
(3-1)

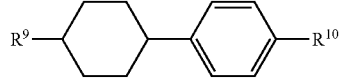
(3-2)

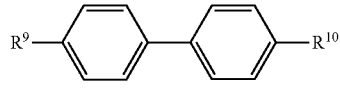
(3-3)

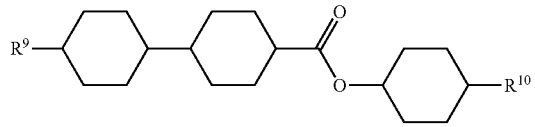
(3-4)

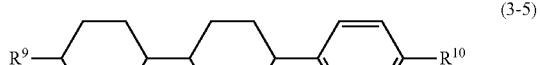
(3-5)

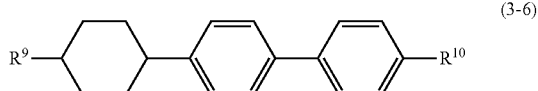
(3-6)

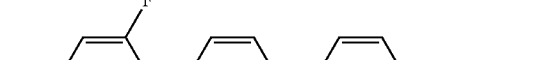
(3-7)

(3-8)

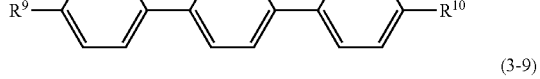
(3-9)

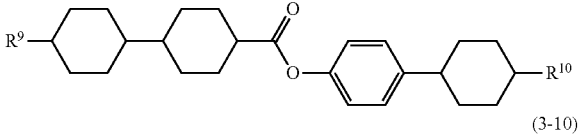
(3-10)

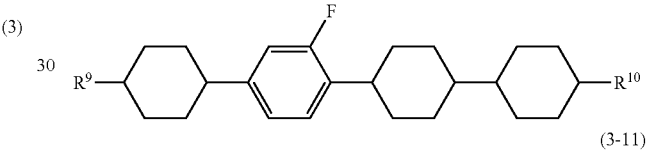
(3-11)

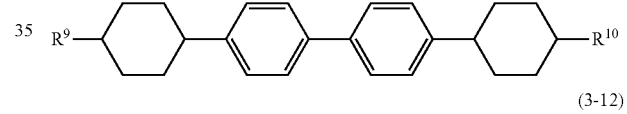
(3-12)

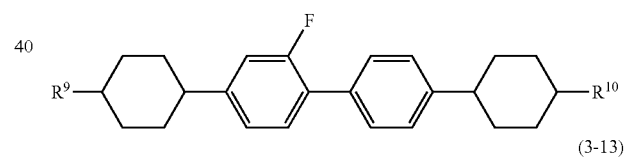
(3-13)

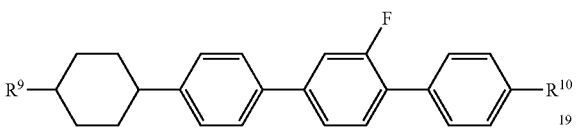

wherein $R^9$ and $R^{10}$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

Item 17. The liquid crystal composition according to item 15, wherein the third component is at least one compound selected from the group of compounds represented by formula (3-1) according to item 16.

Item 18. The liquid crystal composition according to item 15, wherein the third component is a mixture of at least one compound selected from the group of compounds represented by formula (3-1) according to item 16 and at least one compound selected from the group of compounds represented by formula (3-5) according to item 16.

Item 19. The liquid crystal composition according to item 15, wherein the third component is a mixture of at least one compound selected from the group of compounds represented by formula (3-1) according to item 16 and at least one compound selected from the group of compounds represented by formula (3-8) according to item 16.

Item 20. The liquid crystal composition according to item 15, wherein the third component is a mixture of at least one compound selected from the group of compounds represented by formula (3-1) according to item 16, at least one compound selected from the group of compounds represented by formula (3-5) according to item 16 and at least one compound selected from the group of compounds represented by formula (3-8) according to item 16.

Item 21. The liquid crystal composition according to any one of items 15 to 20, wherein a ratio of the third component is in the range of 10% by weight to 95% by weight based on the liquid crystal composition excluding the second component.

Item 22. The liquid crystal composition according to any one of items 1 to 21, further containing at least one compound selected from the group of compounds represented by formula (4) as a fourth component:

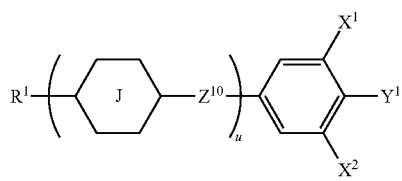

(4)

wherein $R^1$ is alkyl having 1 to 12 carbons, alkoxy having 1 to 12 carbons or an alkenyl having 2 to 12 carbons; ring J is independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl or 2,6,7-trioxabicyclo[2.2.2]-octane-1,4-diyl; $Z^{10}$ is independently a single bond, ethylene, carbonyloxy or difluoromethyleneoxy; $X^1$ and $X^2$ are independently hydrogen or fluorine; $Y^1$ is fluorine, chlorine, trifluoromethyl or trifluoromethoxy; and u is 1 or 2.

Item 23. The liquid crystal composition according to item 22, wherein the fourth component is at least one compound selected from the group of compounds represented by formula (4-1) to formula (4-8):

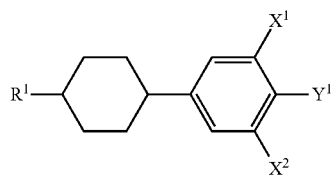

(4-1)

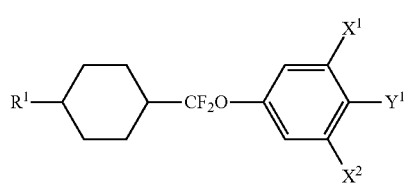

(4-2)

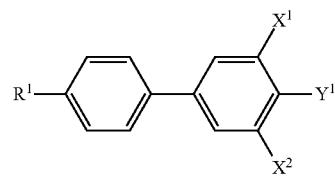

(4-3)

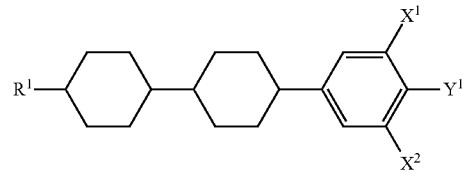

(4-4)

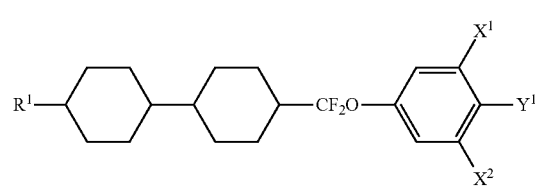

(4-5)

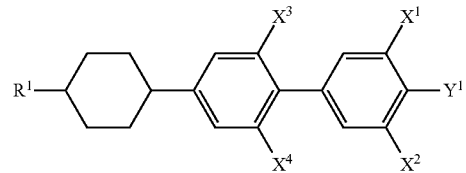

(4-6)

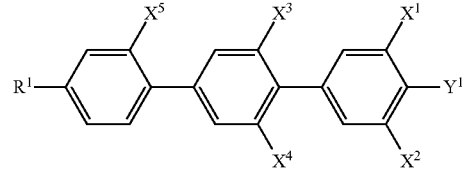

(4-7)

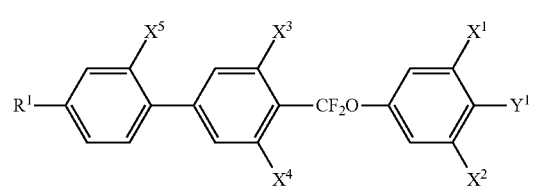

(4-8)

wherein $R^1$ is alkyl having 1 to 12 carbons, alkoxy having 1 to 12 carbons or alkenyl having 2 to 12 carbons; $X^1$, $X^2$, $X^3$, $X^4$ and $X^5$ are independently hydrogen or fluorine; and $Y^1$ is fluorine, chlorine, trifluoromethyl or trifluoromethoxy.

Item 24. The liquid crystal composition according to item 22, wherein the fourth component is at least one compound selected from the group of compounds represented by formula (4-5) according to item 23.

Item 25. The liquid crystal composition according to item 22, wherein the fourth component is at least one compound selected from the group of compounds represented by formula (4-7) according to item 23.

Item 26. The liquid crystal composition according to item 22, wherein the fourth component is at least one compound selected from the group of compounds represented by formula (4-8) according to item 23.

Item 27. The liquid crystal composition according to any one of items 22 to 26, wherein a ratio of the fourth component is in the range of 5% by weight to 40% by weight based on the weight of the liquid crystal composition excluding the second component.

Item 28. The liquid crystal composition according to any one of items 1 to 27, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is 2 or more.

Item 29. A liquid crystal display device having a polymer sustained alignment (PSA) mode, comprising two substrates having an electrode layer on at least one of the substrates, and arranging between the two substrates a liquid crystal material containing a compound obtained by polymerizing a polymerizable compound in the liquid crystal composition according to any one of items 1 to 28.

Item 30. The liquid crystal display device according to item 29, wherein an operating mode of the liquid crystal display device is a TN mode, an OCB mode, an IPS mode or an FFS mode, and a driving mode of the liquid crystal display device is an active matrix mode.

Item 31. A method for manufacturing the liquid crystal display device according to item 29 or 30, wherein a polymerizable compound is polymerized by optically irradiating the liquid crystal composition according to any one of items 1 to 28 as arranged between two substrates in a state of voltage application.

Item 32. Use of the liquid crystal composition according to any one of items 1 to 28 in a liquid crystal display device.

The invention further includes the following items: (1) the composition, further containing the optically active compound; (2) the composition, further containing the additive such as an antioxidant, an ultraviolet light absorber, an antifoaming agent or a polymerization initiator; (3) an AM device including the liquid crystal material containing the compound obtained by polymerizing the polymerizable compound in the composition; (4) a device including the liquid crystal material containing the compound obtained by polymerizing the polymerizable compound in the composition, and having the TN, ECB, OCB, IPS, FFS or PSA mode; (5) a transmissive device including the liquid crystal material containing the compound obtained by polymerizing the polymerizable compound in the composition; (6) use of the composition as the composition having the nematic phase; and (7) use of the composition as an optically active composition by adding the optically active compound to the composition.

The composition of the invention will be explained in the following order. First, a constitution of the component compounds in the composition will be explained. Second, main characteristics of the component compounds and main effects of the compounds on the composition will be explained. Third, a combination of components in the composition, a preferred ratio of the component compounds and the basis thereof will be explained. Fourth, a preferred embodiment of the component compounds will be explained. Fifth, specific examples of the component compounds will be shown. Sixth, the additive that may be mixed with the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain any other liquid crystal compound, the additive or an impurity in addition to the compound selected from compound (1), the polymerizable compound, compound (3) and compound (4). "Any other liquid crystal compound" means a liquid crystal compound different from compound (1), the polymerizable compound, compound (3) and compound (4). Such a compound is mixed with the composition for the purpose of further adjusting the characteristics. The additive includes the optically activity compound, the antioxidant, the ultraviolet light absorber, a dye, the defoaming agent and the polymerization initiator. The impurity includes a compound mixed in a process such as preparation of the component compounds. Even in the case where the compound is liquid crystalline, the compound is classified as the impurity herein.

Composition B consists essentially of a compound selected from the group of compound (1), the polymerizable compound, compound (3) and compound (4). A term "essentially" means that the composition may contain the additive and the impurity, but does not contain any liquid crystal compound different from the compounds. Composition B has a smaller number of components than composition A has. Composition B is preferred to composition A in view of cost reduction. Composition A is preferred to composition B in view of possibility of further adjusting physical properties by mixing any other liquid crystal compound.

Second, the main characteristics of the component compounds and the main effects of the compounds on the characteristics of the composition will be explained. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent classification based on a qualitative comparison among the component compounds, and 0 (zero) means "a value is nearly zero."

TABLE 2

| Characteristics of compounds | | | |
| --- | --- | --- | --- |
| Compound | Compound (1) | Compound (3) | Compound (4) |
| Maximum temperature | M to L | S to L | S to M |
| Viscosity | M to L | S to M | M to L |
| Optical anisotropy | M to L | S to L | M to L |
| Dielectric anisotropy | M to L | 0 | S to L |
| Specific resistance | L | L | L |

Upon mixing the component compounds with the composition, the main effects of the component compounds on the characteristics of the composition are as described below. Compound (1) increases the maximum temperature and increases the dielectric anisotropy. Compound (3) increases the maximum temperature or decreases the viscosity. Compound (4) increases the dielectric anisotropy and decreases the minimum temperature.

Third, the combination of components in the composition, the preferred ratio of the component compounds and the basis thereof will be explained. The combination of components in the composition includes a combination of the first component and the second component, a combination of the first component, the second component and the third component, a combination of the first component, the second component and the fourth component and a combination of the first component, the second component, the third component and the fourth component.

A preferred combination of components in the composition includes the combination of the first component, the second component and the third component, or the combination of the first component, the second component, the third component and the fourth component for decreasing the viscosity.

A preferred ratio of the first component is about 5% by weight or more for increasing the dielectric anisotropy, and about 40% by weight or less for decreasing the minimum temperature, based on the liquid crystal composition excluding the second component. A further preferred ratio is in the range of about 10% by weight to about 35% by weight. A particularly preferred ratio is in the range of about 10% by weight to about 30% by weight.

A preferred ratio of the second compound is about 0.05 part by weight or more for aligning liquid crystal molecules, and about 10 parts by weight or less for avoiding a poor display, based on 100 parts by weight of the liquid crystal composition excluding the second component. A further preferred ratio is in the range of about 0.1 part by weight to about 2 parts by weight.

A preferred ratio of the third component is about 10% by weight or more for increasing the maximum temperature or decreasing the viscosity, and about 95% or less for increasing the dielectric anisotropy, based on the liquid crystal composition excluding the second component. A further preferred ratio is in the range of about 20% by weight to about 85% by weight. A particularly preferred ratio is in the range of about 30% by weight to about 70% by weight.

A preferred ratio of the fourth component is about 5% by weight or more for increasing the dielectric anisotropy, and about 40% by weight or less for decreasing the minimum temperature, based on the liquid crystal composition excluding the second component. A further preferred ratio is in the range of about 5% by weight to about 35% by weight. A particularly preferred ratio is in the range of about 10% by weight to about 30% by weight.

Fourth, the preferred embodiment of the component compounds will be explained.

$R^1$ is alkyl having 1 to 12 carbons, alkoxy having 1 to 12 carbons or alkenyl having 2 to 12 carbons. Preferred $R^1$ is alkyl having 1 to 12 carbons for increasing stability to ultraviolet light or heat. $R^2$, $R^3$, $R^4$ and $R^5$ are independently hydrogen, alkyl having 1 to 12 carbons, alkoxy having 1 to 12 carbons, alkenyl having 2 to 12 carbons, alkenyl having 2 to 12 carbons in which at least one of hydrogen is replaced by fluorine, acryloyl, methacryloyl, vinyloxy, propenyloxy, oxirane, oxetane or vinylcarbonyl, and at least one of $R^2$, $R^3$, $R^4$ and $R^5$ is acryloyl, methacryloyl, vinyl, vinyloxy, propenyloxy, oxirane, oxetane or vinylcarbonyl. Preferred $R^2$, $R^3$, $R^4$ or $R^5$ is acrylate or methacrylate. $R^6$ and $R^7$ are independently hydrogen, halogen, alkyl having 1 to 10 carbons, or alkyl having 1 to 10 carbons in which at least one of hydrogen is replaced by fluorine. $R^6$ or $R^7$ is hydrogen, fluorine or alkyl having 1 to 3 carbons for increasing photoreactivity. $R^8$ is a group selected from the group of groups represented by formula (R-1).

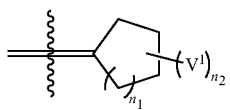

(R-1)

wherein a wavy line in formula (R-1) shows a moiety to be bonded as a group.

$R^9$ and $R^{10}$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine. Preferred $R^9$ or $R^{10}$ is alkenyl having 2 to 12 carbons for decreasing the viscosity, and alkyl having 1 to 12 carbons for increasing the stability to ultraviolet light, or increasing the stability to heat.

In the first component, the third component and the fourth component, preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred examples of alkyl in the second component include methyl, ethyl, propyl, isopropyl, butyl, isobutyl, t-butyl, pentyl, isopentyl, hexyl, isohexyl, heptyl, isoheptyl, octyl, isooctyl, cyclopropyl, cyclobutyl, 2-methylcyclopropyl, cyclopropylmethyl, cyclopentyl, cyclohexyl, trifluoromethyl, perfluoro-n-butyl, 2,2,2-trifluoroethyl, perfluorohexyl, vinyl, 1-propenyl, 2-propenyl, isopropenyl, 1-butenyl, 2-butenyl, 3-butenyl, 1-pentenyl, 2-pentenyl, 3-pentenyl, 4-pentenyl, 1-methyl-2-butenyl, 1-methyl-3-butenyl, 1,1-dimethyl-2-propenyl, 3-methyl-2-butenyl, 1-hexenyl, 2-hexenyl, 3-hexenyl, 4-hexenyl, 5-hexenyl, 2-methyl-1-pentenyl, 3-methyl-1-pentenyl, 4-methyl-1-pentenyl, 2-methyl-2-pentenyl, 3-methyl-2-pentenyl, 2-ethyl-1-butenyl, 3,3-dimethyl-1-butenyl, ethynyl, 1-propynyl, 2-propynyl, 1-butynyl, 2-butynyl, 3-butynyl, 1-pentynyl, 2-pentynyl, 3-pentynyl, 4-pentynyl, 4-methyl-1-pentynyl, 1-hexynyl, phenyl, naphthyl, anthryl, benzyl, methyloxy, ethyloxy, propyloxy, isopropyloxy, butyloxy, isobutyloxy, s-butyloxy, t-butyloxy, pentyloxy, isopentyloxy, hexyloxy, heptyloxy, cyclopropyloxy, cyclobutyloxy, 2-methylcyclopropyloxy, cyclopropylmethyloxy, cyclopentyloxy or cyclohexyloxy. Further preferred examples of alkyl include methyl, ethyl, propyl, isopropyl, trifluoromethyl, 2,2,2-trifluoroethyl, vinyl, 1-propenyl, 2-propenyl, isopropenyl, ethynyl, 1-propynyl, 2-propynyl, methyloxy, ethyloxy, propyloxy or isopropyloxy for increasing the photoreactivity.

In the first component to the fourth component, preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH=CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity, for instance. Cis is preferred in the alkenyl such as 2-butenyl, 2-pentenyl and 2-hexenyl. In the alkenyl, straight-chain alkenyl is preferred to branched-chain alkenyl.

Preferred examples of alkenyl in which at least one of hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

Alkyl does not include cyclic alkyl. Alkoxy does not include cyclic alkoxy. Alkenyl does not include cyclic alkenyl. With regard to a configuration of 1,4-cyclohexylene, trans is preferred to cis for increasing the maximum temperature.

Ring A and ring B are independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl or 2,6,7-trioxabicyclo[2.2.2]octane-1,4-diyl. Two of arbitrary ring A when m is 2 or 3 may be identical or different, and two of arbitrary ring B when j is 2 or 3 may be identical or different. Preferred ring A or ring B is 1,4-phenylene for increasing the optical anisotropy, and 3-fluoro-1,4-phenylene for increasing the dielectric anisotropy.

Ring C, ring D and ring E are independently 1,4-cyclohexylene, 1,4-phenylene, 2-fluoro-1,4-phenylene, 3-fluoro-1,4-phenylene, 2,3-difluoro-1,4-phenylene, 2-methyl-1,4-phenylene, 3-methyl-1,4-phenylene, 2-trifluoromethyl-1,4-phenylene, 3-trifluoromethyl-1,4-phenylene or 2,6-naphthalene, and two of ring D when q is 2 may be identical or different. Preferred ring C, ring D or ring E is 1,4-phenylene.

Ring F and ring G are independently 1,4-cyclohexylene, 1,4-phenylene, 2-fluoro-1,4-phenylene, 3-fluoro-1,4-phenylene or 2,5-difluoro-1,4-phenylene, and two of arbitrary ring F when p is 2 or 3 may be identical or different. Preferred ring F or ring G is 1,4-cyclohexylene for decreasing the viscosity, and 1,4-phenylene for increasing the optical anisotropy. Ring J is 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl or 2,6,7-trioxabicyclo[2.2.2]octane-1,4-diyl, and two of ring J when u is 2 may be identical or different. Preferred ring J is 1,4-phenylene for increasing the optical anisotropy, and 3-fluoro-1,4-phenylene for increasing the dielectric anisotropy. With regard to a configuration of 1,4-cyclohexylene, trans is preferred to cis for increasing the maximum temperature. Then, "2-fluoro-1,4-phenylene" or the like is represented by a ring in which a left-hand side is defined as 1-position to show a difference in a position of fluorine between "2-fluoro-1,4-phenylene" and "3-fluoro-1,4-phenylene."

$Z^1$ and $Z^2$ are independently a single bond, ethylene, carbonyloxy or difluoromethyleneoxy, and two of arbitrary $Z^1$ when m is 2 or 3 may be identical or different, and two of arbitrary $Z^2$ when j is 2 or 3 may be identical or different. Preferred $Z^1$ or $Z^2$ is a single bond for decreasing the viscosity.

$Z^3$ is a single bond, ethylene, methyleneoxy, carbonyloxy, —CO—CR$^6$=CR$^7$—, —CR$^6$=CR$^7$—CO—, —CR$^6$=CR$^7$—, —C(=CR$^6$R$^7$)— or —C(=R$^8$)—. Preferred $Z^3$ is —CO—CR$^6$=CR$^7$—, —CR$^1$=CR$^2$— or —C(=R$^3$)— for increasing polymerization reactivity of the polymerizable compound to obtain characteristics for reducing a response time of the device.

$Z^3$ described above is a bonding group of a type for connecting conjugated systems of conjugated rings with each other. A configuration of a double bond in $Z^3$ in compound (2) includes a cis isomer, a trans isomer or a mixture of the cis isomer and the trans isomer. A configuration of a double bond of a bonding group in compound (2-24), compound (2-25), compound (2-26), compound (2-27) or the like is also similar to the configuration described above.

$Z^4$ is a single bond, ethylene, methyleneoxy or carbonyloxy, and two of $Z^4$ when q is 2 may be identical or different. Preferred $Z^4$ is a single bond.

$Z^5$, $Z^6$, $Z^7$ and $Z^8$ are independently a single bond or alkylene having 1 to 12 carbons. At least one of hydrogen of the alkylene may be replaced by halogen or —C≡N, and at least one of —CH$_2$— may be replaced by —O—, —S—, —NH—, —CO—, —CO—O—, —O—CO—, —O—CO—O—, —CH=CH— or —C≡C—. Herein, adjacent —CH$_2$— is not replaced by an identical group. Preferred $Z^5$, $Z^6$, $Z^7$ or $Z^8$ are a single bond for increasing the photoreactivity.

$Z^9$ is a single bond, ethylene, methyleneoxy or carbonyloxy, and two of arbitrary $Z^9$ when p is 2 or 3 may be identical or different. Preferred $Z^9$ is a single bond for decreasing the viscosity.

$Z^{10}$ is a single bond, ethylene, carbonyloxy or difluoromethyleneoxy, and two of arbitrary $Z^{10}$ when u is 2 may be identical or different. Preferred $Z^{10}$ is a single bond for decreasing the viscosity.

$X^1$, $X^2$, $X^3$, $X^4$, $X^5$, $X^6$, $X^7$, $X^8$, $X^9$, $X^{10}$, $X^{11}$, and $X^{12}$ are independently hydrogen or fluorine. As for preferred $X^1$, $X^2$, $X^3$, $X^4$, $X^5$, $X^6$, $X^7$, $X^8$, $X^9$, $X^{10}$, $X^{11}$ or $X^{12}$, two or more thereof are fluorine for increasing the dielectric anisotropy.

$Y^1$ is fluorine, chlorine, trifluoromethyl or trifluoromethoxy. Preferred $Y^1$ is fluorine for decreasing the viscosity, and chlorine or trifluoromethoxy for decreasing the minimum temperature.

$V^1$ is halogen, alkyl having 1 to 6 carbons, or alkyl having 1 to 6 carbons in which at least one of hydrogen is replaced by fluorine, and two of arbitrary $V^1$ when $n_2$ is 2, 3 or 4 may be identical or different. Preferred $V^1$ is fluorine or alkyl having 1 to 3 carbons.

Then, q is 0, 1 or 2. Preferred q is 0 for decreasing the minimum temperature. Moreover, m and j are independently 0, 1, 2 or 3, and a sum of m and j is 2 or 3. Preferred m is 2 for increasing the maximum temperature. Preferred j is 0 for decreasing the minimum temperature. Moreover, $n_1$ is an integer from 1 to 8. Preferred $n_1$ is 1 or 2 for increasing the photoreactivity. Further, $n_2$ is an integer from 0 to 4. Preferred $n_2$ is an integer from 0 to 2 for increasing the photoreactivity. Further preferred $n_2$ is 0. Furthermore, p is 1, 2 or 3. Preferred p is 1 for decreasing the viscosity, and 2 or 3 for increasing the maximum temperature. Furthermore, u is 1 or 2. Preferred u is 2 for increasing the maximum temperature.

Compound (2) can form a homopolymer or a copolymer according to homopolymerization, copolymerization or copolymerization with any other polymerizable compound.

Fifth, the specific examples of the component compounds will be shown. In preferred compounds as described below, $R^6$ and $R^7$ are independently hydrogen, halogen, alkyl having 1 to 10 carbons, or alkyl having 1 to 10 carbons in which at least one of hydrogen is replaced by fluorine. $R^{11}$ is straight-chain alkyl having 1 to 12 carbons or straight-chain alkoxy having 1 to 12 carbons. $R^{12}$ and $R^{13}$ are independently straight-chain alkyl having 1 to 12 carbons or straight-chain alkenyl having 2 to 12 carbons. $R^{14}$, $R^{15}$ and $R^{16}$ are independently acryloyl or methacryloyl. $Z^5$, $Z^6$ and $Z^8$ are independently a single bond or alkylene having 1 to 12 carbons, at least one of hydrogen of the alkylene may be replaced by halogen or —C≡N, and at least one of non-adjacent —CH$_2$— may be replaced by —O—, —S—, —NH—, —CO—, —CO—O—, —O—CO—, —O—CO—O—, —CH=CH— or —C≡C—.

Preferred compound (1) includes compound (1-1-1), compound (1-2-1) to compound (1-2-4), compound (1-3-1) to compound (1-3-2), compound (1-4-1), compound (1-5-1), compound (1-6-1) to compound (1-6-2), compound (1-7-1), compound (1-8-1), compound (1-9-1), and compound (1-10-1) to compound (1-10-2). Further preferred compound (1) includes compound (1-2-1), compound (1-2-3), compound (1-2-4), compound (1-3-1), compound (1-4-1) and compound (1-10-2). Particularly preferred compound (1) includes compound (1-2-1), compound (1-2-3), compound (1-2-4) and compound (1-3-1). Preferred compound (2) includes compound (2-1-1) to compound (2-26-1). Further preferred compound (2) includes compound (2-1-1), compound (2-2-1), compound (2-3-1), compound (2-4-1), compound (2-5-1), compound (2-6-1), compound (2-7-1), compound (2-18-1), compound (2-20-1) and compound (2-23-1). Particularly preferred compound (2) includes compound (2-2-1), compound (2-3-1), compound (2-4-1), compound (2-18-1) and compound (2-23-1). Preferred compound (3)

includes compound (3-1-1) to compound (3-13-1). Further preferred compound (3) includes compound (3-1-1), compound (3-2-1), compound (3-3-1), compound (3-5-1), compound (3-8-1) and compound (3-13-1). Particularly preferred compound (3) includes compound (3-1-1), compound (3-3-1), compound (3-5-1) and compound (3-8-1). Preferred compound (4) includes compound (4-1-1), compound (4-2-1), compound (4-3-1) to compound (4-3-2), compound (4-4-1) to compound (4-4-2), compound (4-5-1) to compound (4-5-2), compound (4-6-1) to compound (4-6-2), compound (4-7-1), and compound (4-8-1) to compound (4-8-3). Further preferred compound (4) includes compound (4-1-1), compound (4-5-1), compound (4-6-2), compound (4-7-1), compound (4-8-1) and compound (4-8-2). Particularly preferred compound (4) includes compound (4-5-1), compound (4-7-1), compound (4-8-1) and compound (4-8-2).

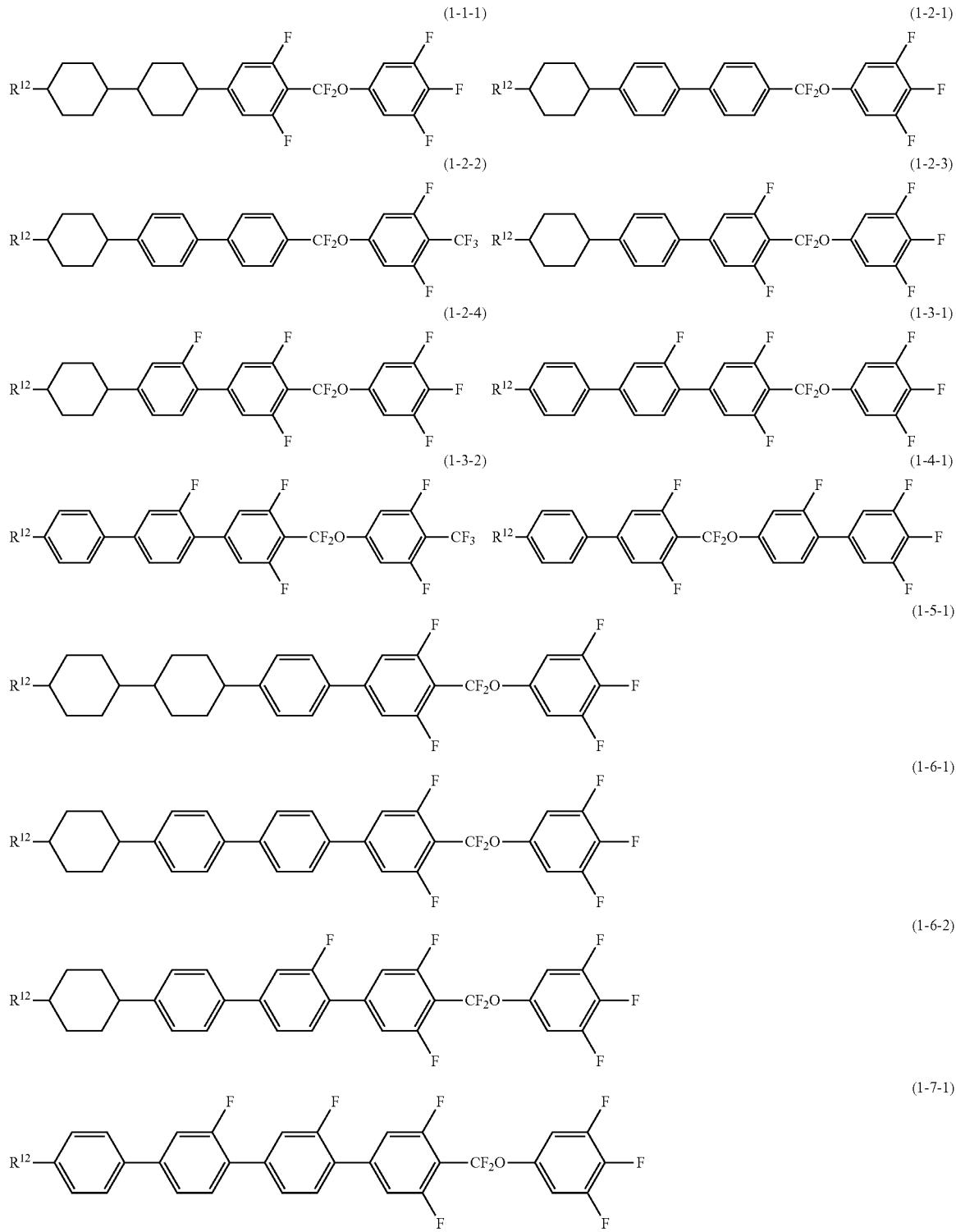

-continued
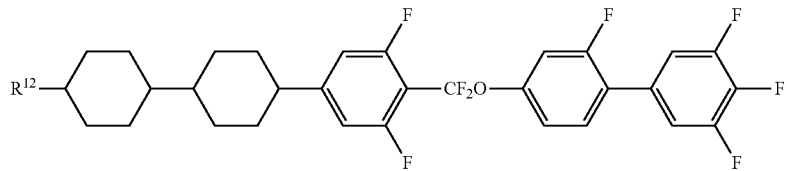
(1-8-1)
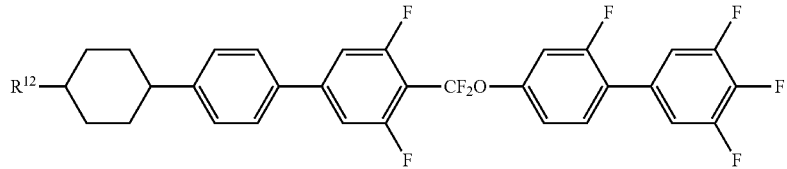
(1-9-1)
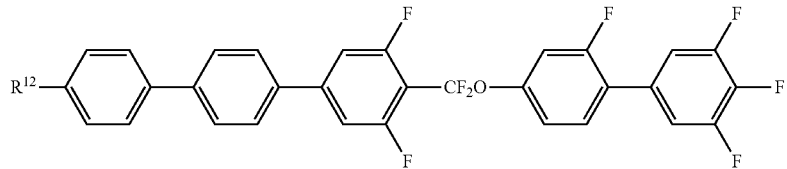
(1-10-1)
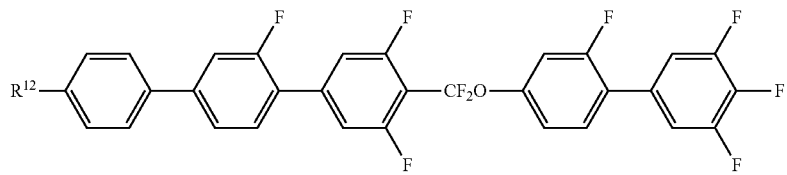
(1-10-2)
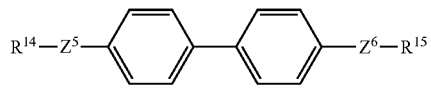
(2-1-1)
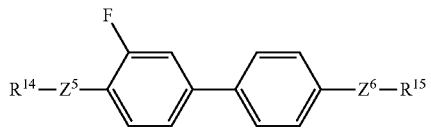
(2-2-1)
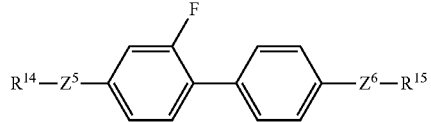
(2-3-1)
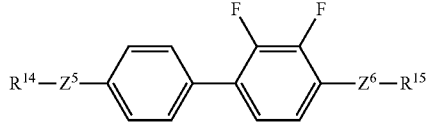
(2-4-1)
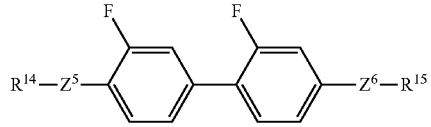
(2-5-1)
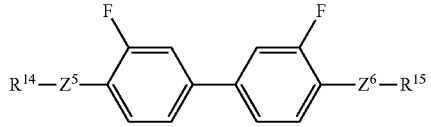
(2-6-1)
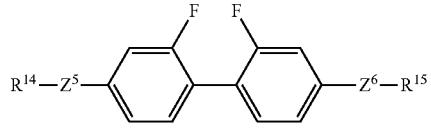
(2-7-1)
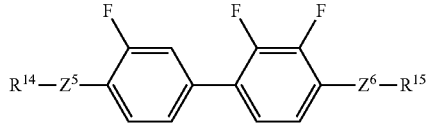
(2-8-1)
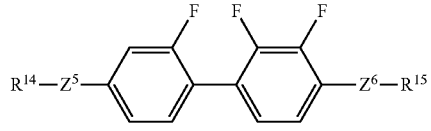
(2-9-1)
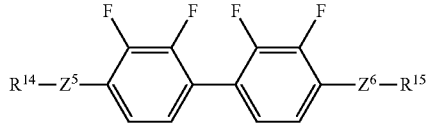
(2-10-1)
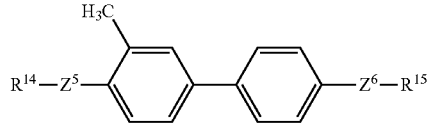
(2-11-1)
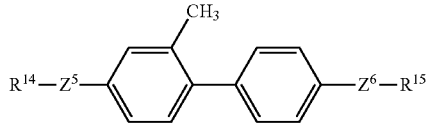
(2-12-1)

-continued
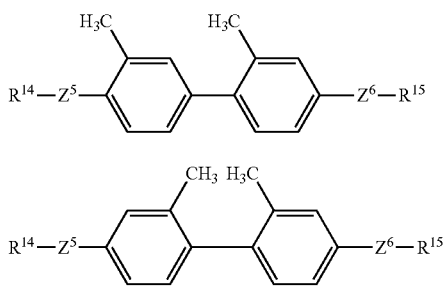
(2-13-1)
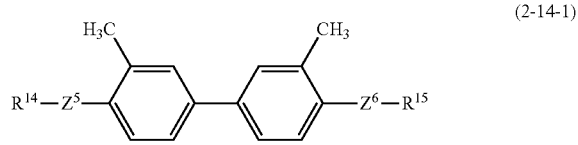
(2-14-1)
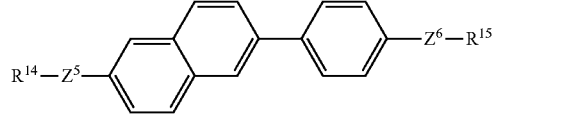
(2-16-1)
(2-15-1)
(2-17-1)
(2-18-1)
(2-19-1)
(2-20-1)
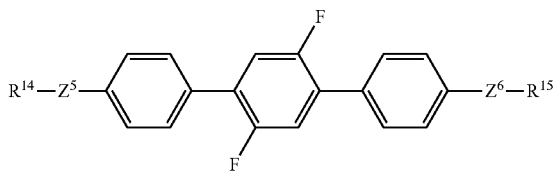
(2-21-1)
(2-22-1)
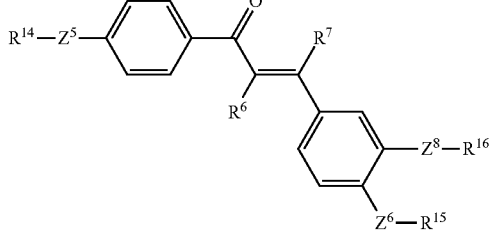
(2-23-1)
(2-24-1)
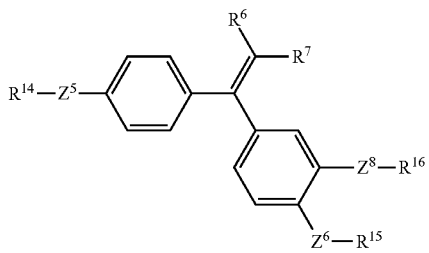
(2-25-1)
(2-26-1)
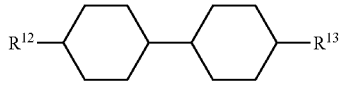
(3-1-1)
(3-2-1)
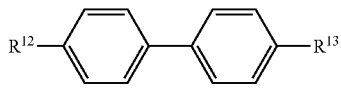
(3-3-1)
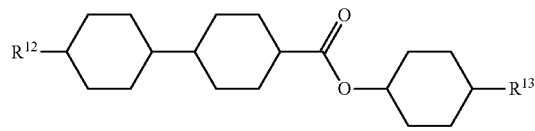
(3-4-1)

-continued
(3-5-1) 
(3-6-1) 
(3-7-1) 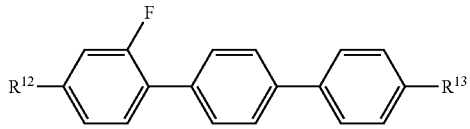
(3-8-1) 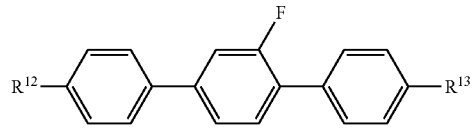
(3-9-1) 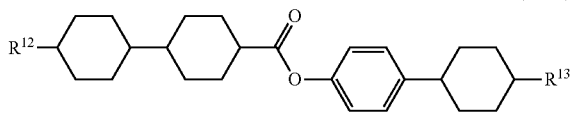
(3-10-1) 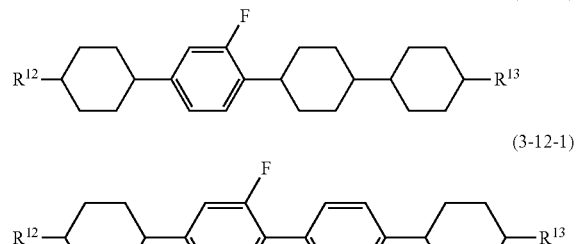
(3-11-1) 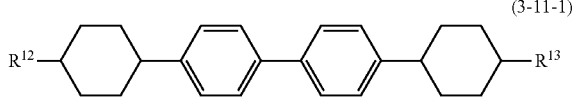
(3-12-1)
(3-13-1) 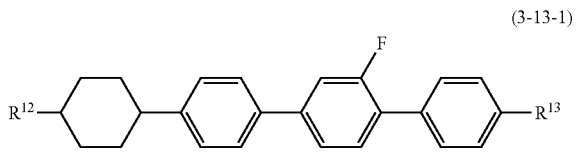
(4-1-1) 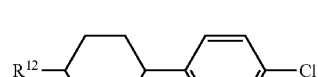
(4-2-1) 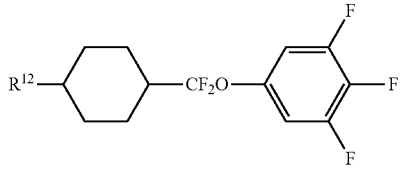
(4-3-1) 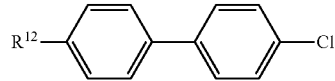
(4-3-2) 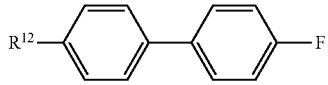
(4-4-1) 
(4-4-2) 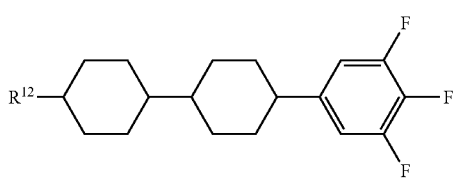
(4-5-1) 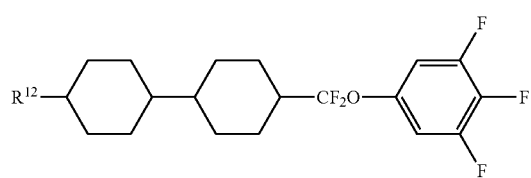
(4-5-2) 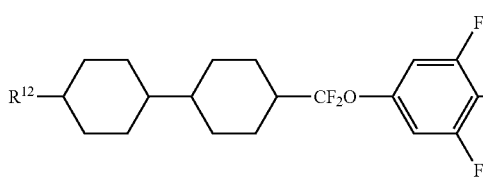
(4-6-1) 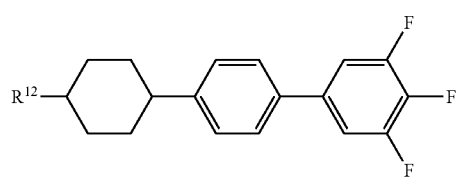
(4-6-2) 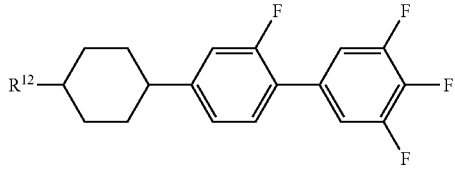
(4-7-1) 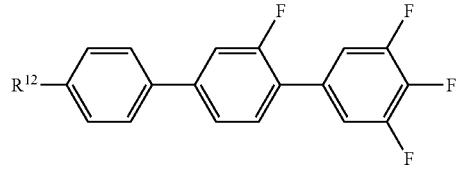

(4-8-1)

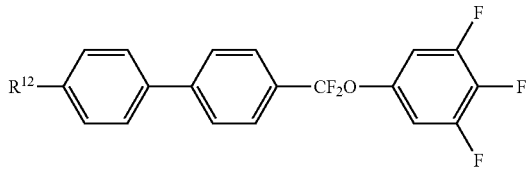

(4-8-2)

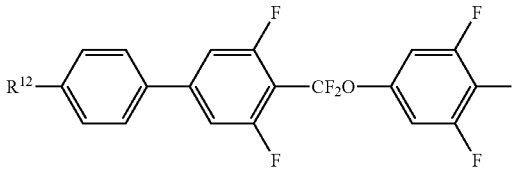

(4-8-3)

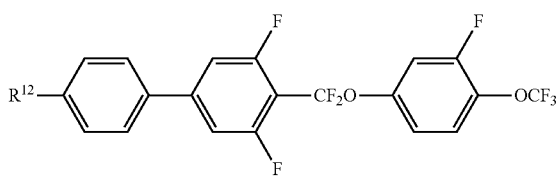

Sixth, the additive that may be mixed with the composition will be explained. Such an additive includes the optically active compound, the antioxidant, the ultraviolet light absorber, the dye, the antifoaming agent and the polymerization initiator. The optically active compound is mixed with the composition for the purpose of inducing a helical structure in liquid crystals to give a twist angle. Examples of such a compound include compound (5-1) to compound (5-5). A preferred ratio of the optically active compound is about 5% by weight or less. A further preferred ratio is in the range of about 0.01% by weight to about 2% by weight.

(5-1)

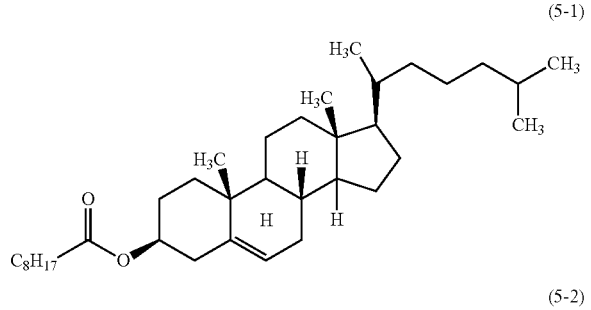

(5-2)

(5-3)

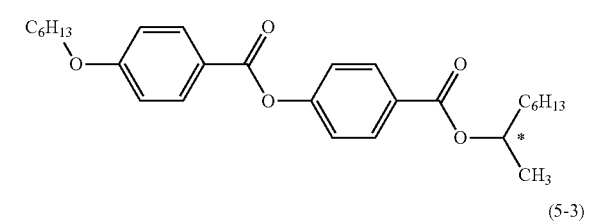

(5-4)

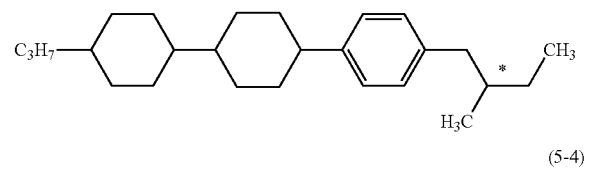

(5-5)

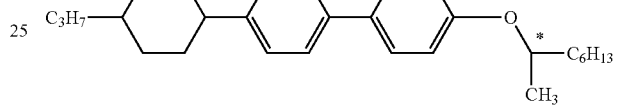

The antioxidant is mixed with the composition for the purpose of preventing a decrease in the specific resistance caused by heating in air, or maintaining a large voltage holding ratio at room temperature and also at a temperature close to the maximum temperature of the nematic phase after the device has been used for a long period of time.

(6)

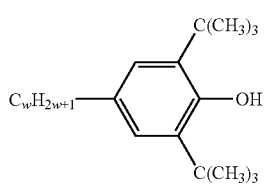

Preferred examples of the antioxidant include compound (6) where w is an integer from 1 to 9. In compound (6), preferred w is 1, 3, 5, 7 or 9. Further preferred w is 1 or 7. Compound (6) where w is 1 is effective in preventing a decrease in the specific resistance caused by heating in air because the compound (6) has a large volatility. Compound (6) where w is 7 is effective in maintaining a large voltage holding ratio at room temperature and also at a temperature close to the maximum temperature of the nematic phase after the device has been used for a long period of time because the compound (6) has a small volatility. A preferred ratio of the antioxidant is about 50 ppm or more for achieving the effect thereof, and about 600 ppm or less for avoiding a decrease in the maximum temperature or avoiding an increase in the minimum temperature. A further preferred ratio is in the range of about 100 ppm to about 300 ppm.

Preferred examples of the ultraviolet light absorber include a benzophenone derivative, a benzoate derivative and a triazole derivative. A light stabilizer such as an amine having steric hindrance is also preferred. A preferred ratio of the ultraviolet light absorber or the stabilizer is about 50 ppm or more for achieving the effect thereof, and about 10,000 ppm or less for avoiding a decrease in the maximum temperature or avoiding an increase in the minimum temperature. A further preferred ratio is in the range of about 100 ppm to about 10,000 ppm.

A dichroic dye such as an azo dye or an anthraquinone dye is mixed with the composition to be adapted for a device having a guest host (GH) mode. A preferred ratio of the dye is in the range of about 0.01% by weight to about 10% by weight.

The antifoaming agent such as dimethyl silicone oil or methyl phenyl silicone oil is mixed with the composition for preventing foam formation. A preferred ratio of the antifoaming agent is about 1 ppm or more for achieving the effect thereof, and about 1,000 ppm or less for avoiding a poor display. A further preferred ratio is in the range of about 1 ppm to about 500 ppm.

The liquid crystal composition of the invention contains the polymerizable compound. Therefore, the composition is suitable for use in a device having the polymer sustained alignment (PSA) mode. Preferred examples of the polymerizable compound include compound (2), and a compound having a polymerizable group, such as an acrylate, a methacrylate, a vinyl compound, a vinyloxy compound, a propenyl ether, an epoxy compound (oxirane, oxetane) and vinyl ketone. Particularly preferred examples include an acrylate derivative or a methacrylate derivative. A preferred ratio of the polymerizable compound is about 0.05 part by weight or more for achieving the effect thereof, and about 10 parts by weight or less for avoiding a poor display, based on 100 parts by weight of the liquid crystal composition excluding the polymerizable compound. A further preferred ratio is in the range of about 0.1 part by weight to about 2 parts by weight. The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to a person skilled in the art and are described in literatures. For example, Irgacure 651 (registered trademark; BASF), Irgacure 184 (registered trademark; BASF) or Darocure 1173 (registered trademark; BASF), each being the photopolymerization initiator, is suitable for radical polymerization. A preferred ratio of the photopolymerization initiator is in the range of about 0.1% by weight to about 5% by weight based on the polymerizable compound, and a particularly preferred ratio is in the range of about 1% by weight to about 3% by weight. A process may be applied through which the liquid crystal composition containing the polymerizable compound is arranged between two substrates in the liquid crystal display device and the polymerizable compound is polymerized while applying voltage between opposing electrode layers on the substrate, or a liquid crystal composition containing a preliminarily polymerized compound may be arranged between the two substrates in the liquid crystal display device.

Seventh, the methods for synthesizing the component compounds will be explained. The compounds can be prepared according to known methods. Examples of synthetic methods will be shown. Compound (1-3-1) is prepared by the method described in JP H10-251186 A (1998). Compound (2-18-1) is prepared by the method described in JP H7-101900 A (1995). Compound (3-5-1) is prepared by the method described in JP S57-165328 A (1982). Compound (4-4-2) and compound (4-6-1) are prepared by the method described in JP H2-233626 A (1990). A compound represented by formula (6) where w is 1 is available from Sigma-Aldrich Corporation. Compound (6) where w is 7 and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be explained. Most of the compositions have a minimum temperature of about $-10°$ C. or lower, a maximum temperature of about 70° C. or higher, and an optical anisotropy in the range of about 0.07 to about 0.20. The device including the composition has a large voltage holding ratio. The composition is suitable for use in the AM device. The composition is particularly suitable for use in a transmissive AM device. A composition having an optical anisotropy in the range of about 0.08 to about 0.25 may be prepared by controlling the ratio of the component compounds or by mixing with any other liquid crystal compound. Furthermore, a composition having an optical anisotropy in the range of about 0.10 to about 0.30 may be prepared. The composition can be used as the composition having the nematic phase and as the optically active composition by adding the optically active compound.

The composition can be used for the AM device. The composition can also be used for a PM device. The composition can also be used for an AM device and a PM device both having a mode such as PC, TN, STN, ECB, OCB, IPS, FFS, VA or PSA. Use for the AM device having the OCB, IPS or FFS mode is particularly preferred. In the AM device having the IPS mode or FFS mode, alignment of the liquid crystal molecules in a state of no voltage application may be parallel or perpendicular to a panel substrate. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, and for a polymer dispersed (PD) device in which a three-dimensional network polymer is formed in the composition.

EXAMPLES

In order to evaluate characteristics of a composition and a compound to be contained in the composition, the composition and the compound were made a measurement object. When the measurement object was the composition, the measurement object was measured as a sample as is, and values obtained were described. When the measurement object was the compound, a sample for measurement was prepared by mixing the compound (15% by weight) with mother liquid crystals (85% by weight). Values of characteristics of the compound were calculated using values obtained by measurement, according to an extrapolation method: (extrapolated value)={(measured value of a sample for measurement)−0.85×(measured value of mother liquid crystals)}/ 0.15. When a smectic phase (or crystals) precipitated at the ratio thereof at 25° C., a ratio of the compound to the mother liquid crystals was changed step by step in the order of (10% by weight:90% by weight), (5% by weight:95% by weight) and (1% by weight:99% by weight). Values of a maximum temperature, an optical anisotropy, viscosity and a dielectric anisotropy with regard to the compound were determined according to the extrapolation method.

Components of the mother liquid crystals were as described below. A ratio of each component is expressed in terms of % by weight.

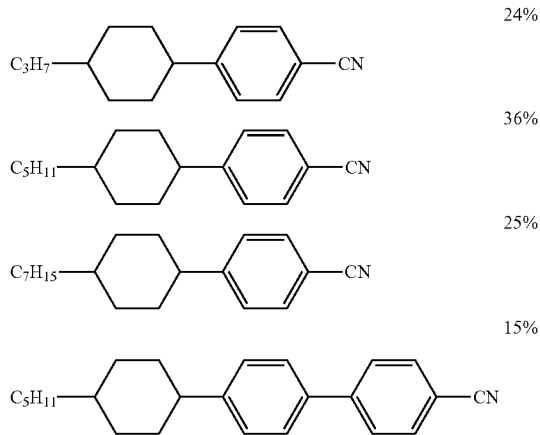

24%

36%

25%

15%

The characteristics were measured according to the methods described below. Most of the methods are applied as described in Standard of Japan Electronics and Information Technology Industries Association, hereafter abbreviated as JEITA) discussed and established as Standard of JEITA (JEITA ED-2521B), or as modified thereon.

Maximum Temperature of a Nematic Phase (NI; ° C.): A sample was placed on a hot plate in a melting point apparatus equipped with a polarizing microscope and was heated at a rate of 1° C. per minute. Temperature when a part of the sample began to change from a nematic phase to an isotropic liquid was measured. A higher limit of a temperature range of the nematic phase may be abbreviated as "maximum temperature."

Minimum Temperature of a Nematic Phase ($T_c$; ° C.): A sample having a nematic phase was put in glass vials and kept in freezers at 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c \leq -20°$ C. A lower limit of the temperature range of the nematic phase may be abbreviated as "minimum temperature."

Viscosity (bulk viscosity; η; measured at 20° C.; mPa·s): A cone-plate (E type) rotational viscometer was used for measurement.

Viscosity (rotational viscosity; γ1; measured at 25° C.; mPa·s): Rotational viscosity was measured according to the method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. A voltage was stepwise applied to the device in the range of 16 V to 19.5 V at an increment of 0.5 V. After a period of 0.2 second with no application, a voltage was repeatedly applied under the conditions of only one of rectangular waves (rectangular pulse; 0.2 second) and no application (2 seconds). A peak current and a peak time of a transient current generated by the application were measured. A value of rotational viscosity was obtained from the measured values and calculation equation (8) on page 40 of the paper presented by M. Imai et al. A value of dielectric anisotropy necessary for the calculation was determined according to a method as described below by using the device used for measuring the rotational viscosity.

Optical Anisotropy (refractive index anisotropy; Δn; measured at 25° C.): Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−n⊥.

Dielectric Anisotropy (Δ∈; measured at 25° C.): A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (∈∥) in the major axis direction of liquid crystal molecules was measured. Sine waves (0.5 V, 1 kHz) were applied to the device, and after 2 seconds, a dielectric constant (∈⊥) in the minor axis direction of the liquid crystal molecules was measured. A value of dielectric anisotropy was calculated from an equation: Δ∈=∈∥−∈⊥.

Threshold Voltage (Vth; measured at 25° C.; V): An LCD-5100 luminance meter made by Otsuka Electronics Co., Ltd. was used for measurement. A light source was a halogen lamp. A sample was put in a normally black mode FFS device in which a distance (cell gap) between two glass substrates was 0.34/Δn micrometers and an optical alignment film was arranged, and the device was sealed with an ultraviolet-curable adhesive. A voltage (32 Hz, rectangular waves) to be applied to the device was stepwise increased from 0 V to 10 V at an increment of 0.02 V. On the occasion, the device was irradiated with light from a direction perpendicular to the device, and the amount of light transmitted through the device was measured. A voltage-transmittance curve was prepared, in which the maximum amount of light corresponds to 100% transmittance and the minimum amount of light corresponds to 0% transmittance. A threshold voltage is a voltage at 10% transmittance.

Voltage Holding Ratio (VHR-1; at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-2; at 80° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the TN device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-3; at 25° C.; %): Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In measuring VHR-3, a decaying voltage was measured for 16.7 milliseconds. A composition having a large VHR-3 has a large stability to ultraviolet light. A value of VHR-3 is preferably 90% or more, further preferably, 95% or more.

Voltage Holding Ratio (VHR-4; at 25° C.; %): A TN device into which a sample was injected was heated in a constant-temperature bath at 80° C. for 500 hours, and then stability to heat was evaluated by measuring a voltage holding ratio. In measuring VHR-4, a decaying voltage was measured for 16.7 milliseconds. A composition having a large VHR-4 has a large stability to heat.

Response Time (τ; measured at 25° C.; ms): An LCD-5100 luminance meter made by Otsuka Electronics Co., Ltd. was used for measurement. A light source was a halogen lamp. A low-pass filter was set at 5 kHz. A sample was put in a normally black mode FFS device in which a distance (cell gap) between two glass substrates was 3.4 micrometers and an optical alignment film was arranged, and the device was sealed with an ultraviolet-curable adhesive. The device was irradiated with ultraviolet light having 25 mW/cm$^2$ (using EXECURE4000-D lamp made by HOYA CANDEO OPTRONICS CORPORATION) for 400 seconds. Rectangular waves (60 Hz, 5 V, 0.5 second) were applied to the device. On the occasion, the device was irradiated with light from a direction perpendicular to the device, and the amount of light transmitted through the device was measured. The maximum amount of light corresponds to 100% transmittance, and the minimum amount of light corresponds to 0% transmittance. Rise time (τr; millisecond) is a period of time required for a change from 10% transmittance to 90% transmittance. Fall time (τf; millisecond) is a period of time required for a change from 90% transmittance to 10% transmittance. A response time is a sum of the thus determined rise time and fall time.

Elastic constant (K; measured at 25° C.; pN): HP4284A LCR Meter made by Yokogawa-Hewlett-Packard Co. was used for measurement. A sample was put in a homogeneous alignment cell in which a distance (cell gap) between two glass substrates was 20 micrometers. An electric charge from 0 V to 20 V was applied to the cell, and electrostatic capacity and applied voltage were measured. Measured values of the electrostatic capacity (C) and the applied voltage (V) were fitted to equation (2.98) and equation (2.101) on page 75 of "Liquid Crystal Device Handbook" (Ekisho Debaisu Handobukku in Japanese) (The Nikkan Kogyo Shimbun, Ltd.), and values of K11 and K33 were obtained from equation (2.99). Next, K22 was calculated using the previously determined values of K11 and K33 in equation (3.18) on page 171 of the same Handbook. An elastic constant is a mean value of the thus determined K11, K22 and K33.

Specific Resistance (ρ; measured at 25° C.; Ωcm): Into a vessel equipped with electrodes, 1.0 milliliter of a sample was injected. A DC voltage (10 V) was applied to the vessel, and a DC current after 10 seconds was measured. A specific resistance was calculated from the following equation:

(specific resistance)={(voltage)×(electric capacity of a vessel)}/{(direct current)×(dielectric constant of vacuum)}.

Helical Pitch (P; measured at room temperature; μm): A helical pitch was measured according to a wedge method (Handbook of Liquid Crystals (Ekisho Binran in Japanese), page 196, (issued in 2000, Maruzen Co., Ltd.)). A sample was injected into a wedge cell and left to stand at room temperature for 2 hours, and then a gap (d2–d1) between disclination lines was observed by means of a polarizing microscope (trade name: MM40/60 series, Nikon Corporation). The helical pitch (P) was calculated according to the following equation in which an angle of the wedge cell was expressed as θ:

$P = 2 \times (d2-d1) \times \tan \theta.$ $^1$H-NMR Analysis: As a measuring apparatus, DRX-500 (made by Bruker BioSpin Corporation) was used. A sample prepared in Examples and so forth was dissolved in a deuterated solvent such as $CDCl_3$ in which the sample was soluble, and measurement was carried out under the conditions of room temperature, 500 MHz and 24 times of accumulation. In addition, in explaining nuclear magnetic resonance spectra obtained, s, d, t, q and m stand for a singlet, a doublet, a triplet, a quartet and a multiplet, respectively. Tetramethylsilane (TMS) was used as a reference material for a zero point of chemical shifts (δ values).

Gas Chromatographic Analysis: GC-14B Gas Chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample injector. A recorder was C-R5A Chromatopac made by Shimadzu Corporation or the equivalent thereof. The resulting chromatogram showed a retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A ratio of liquid crystal compounds contained in a composition may be calculated by the method as described below. The liquid crystal compounds can be detected by means of a gas chromatograph. A ratio of the peak areas in the gas chromatogram corresponds to a ratio (in the number of moles) of the liquid crystal compounds. When the capillary column described above was used, a correction coefficient of each of the liquid crystal compounds may be regarded as 1 (one). Accordingly, the ratio (% by weight) of the liquid crystal compounds was calculated from the ratio of the peak areas.

The invention will be explained in detail by way of Examples. The invention is not limited by the Examples described below. The compounds in Comparative Examples and Examples were described using symbols according to definitions in Table 3 below. In Table 3, a configuration of 1,4-cyclohexylene is trans. A parenthesized number next to a symbolized compound corresponds to the number of the compound. A symbol (-) means any other liquid crystal compound. A ratio (percentage) of the liquid crystal compounds is expressed in terms of weight percent (% by weight) based on the total weight of the liquid crystal composition. The liquid crystal composition further includes an impurity. Last, values of characteristics of the composition were summarized.

TABLE 3

Method for Description of Compounds using Symbols
R—(A$_1$)—Z$_1$— ... —Z$_n$—(A$_n$)—R'

| 1) Left-terminal Group R— | Symbol |
|---|---|
| C$_n$H$_{2n+1}$— | n- |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |
| CH$_2$=CH—COO— | AC— |
| CH$_2$=C(CH$_3$)—COO— | MAC— |

| 2) Right-terminal Group —R' | Symbol |
|---|---|
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | —nV |
| —CH=CF$_2$ | —VFF |
| —F | —F |
| —Cl | —CL |
| —CF$_3$ | —CF3 |
| —OCF$_3$ | —OCF3 |
| —CN | —C |
| —OCO—CH=CH$_2$ | —AC |
| —OCO—C(CH$_3$)=CH$_2$ | —MAC |

| 3) Bonding Group —Z$_n$— | Symbol |
|---|---|
| —C$_2$H$_4$— | 2 |
| —COO— | E |
| —CH=CH— | V |
| —CH=CH—O— | VO |
| —C≡C— | T |
| —CF$_2$O— | X |

| 4) Ring Structure —A$_n$— | Symbol |
|---|---|
|  | H |
|  | B |
|  | B(F) |
|  | B(2F) |

TABLE 3-continued

Method for Description of Compounds using Symbols
R—(A$_1$)—Z$_1$— ... —Z$_n$—(A$_n$)—R'

| | |
|---|---|
| 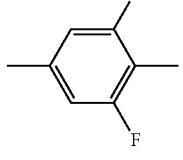 | B(F,F) |
| 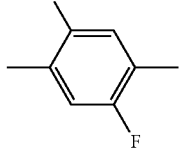 | B(2F,5F) |
| 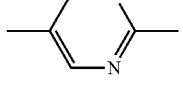 | Py |
| 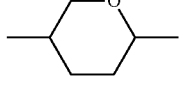 | dh |
| 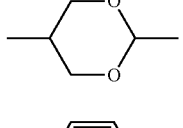 | G |
| 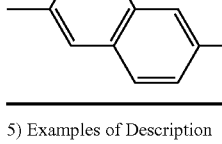 | Np |

5) Examples of Description

Example 1 5-BB(F)B(F,F)XB(F,F)—CF3

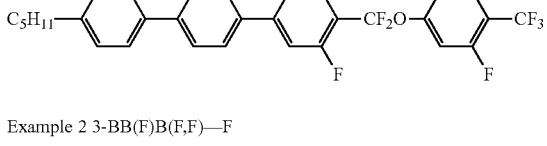

Example 2 3-BB(F)B(F,F)—F

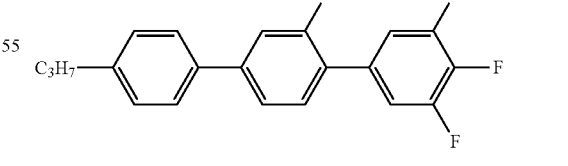

Example 3 V—HHB-1

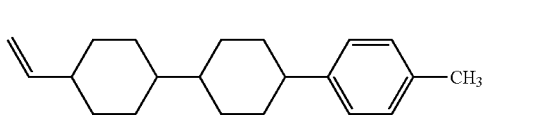 [SMILES: C=CC1CCC(C2CCC(c3ccc(C)cc3)CC2)CC1]

TABLE 3-continued

Method for Description of Compounds using Symbols
R—(A$_1$)—Z$_1$— ... —Z$_n$—(A$_n$)—R'

Example 4  3-HHEBH-5

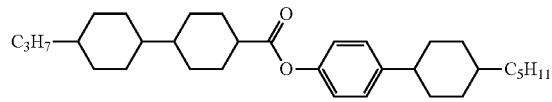

Comparative Example 1

An Example in which 1 part by weight of polymerizable compound was contained was selected from the compositions disclosed in JP 2006-502264 A. The reason is that the composition has the shortest response time. Components and characteristics of the composition are as described below.

| | | |
|---|---|---|
| 3-HH-O1 | (3-1) | 5% |
| 3-HHEH-3 | (3-4-1) | 3% |
| 3-HHEH-5 | (3-4-1) | 3% |
| 2-HHB(F,F)-F | (4-4-2) | 6% |
| 2-HHEB(F,F)-F | (4) | 6% |
| 3-HHEB(F,F)-F | (4) | 16% |
| 5-HHEB(F,F)-F | (4) | 6% |
| 2-HGB(F,F)-F | (—) | 10% |
| 3-HGB(F,F)-F | (—) | 12% |
| 5-HGB(F,F)-F | (—) | 8% |
| 3-HH-CF3 | (—) | 9% |
| 5-HH-CF3 | (—) | 12% |
| 3-HHBH-4 | (3) | 4% |

Into 100 parts by weight of the composition, 1.0 part by weight of a compound as described below (compound Ij in JP 2006-502264 A) was added.

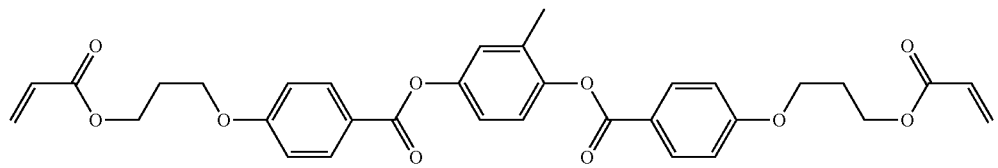 [SMILES: C=CC(=O)OCCCOc1ccc(C(=O)Oc2ccc(OC(=O)c3ccc(OCCCOC(=O)C=C)cc3)c(C)c2)cc1]

NI=68.0° C.; Δn=0.060; Δ∈=10.3; Vth=2.08 V; γ1=161.0 mPa·s; τ=24.1 ms.

Comparative Example 2

Example 3 was selected from the compositions disclosed in WO 2010/089092 A. The reason is that the composition contains compound (1-3-1), compound (3-1-1), compound (3-2-1), compound (3-8-1), compound (4-4-2), compound (4-5-1) and compound (4-7-1). Because the Example did not describe a composition having 100% in total, a composition was prepared in ratios relative thereto. Components and characteristics of the composition are as described below.

| | | |
|---|---|---|
| 3-HHXB(F,F)-F | (4-5-1) | 4.5 parts by weight |
| 5-HHXB(F,F)-F | (4-5-1) | 6 parts by weight |
| 3-HHB(F,F)-F | (4-4-2) | 10 parts by weight |
| 5-HHB(F,F)-F | (4-4-2) | 10 parts by weight |
| 3-BB(F)B(F,F)-F | (4-7-1) | 12 parts by weight |
| 3-BB(F)B(F,F)XB(F,F)-F | (1-3-1) | 4 parts by weight |
| 3-HHB(F)B(F,F)-F | (—) | 5 parts by weight |
| V-HH-3 | (3-1-1) | 30 parts by weight |
| 3-HB-O1 | (3-2-1) | 6.5 parts by weight |
| 2-BB(F)B-4 | (3-8-1) | 3 parts by weight |
| 2-BB(F)B-5 | (3-8-1) | 4 parts by weight |

Then, 95 parts by weight of the composition described above was converted into 100 parts by weight, and 0.3 part by weight of each of compound (2-1-1) as described below and a compound as described below (compound RM-4 in WO 2010/089092 A) was added.

| | |
|---|---|
| MAC-BB-MAC | (2-1-1) |
| MAC-Np-MAC | (—) |

NI=75.0° C.; Δn=0.103; Δ∈=8.0; γ1=85.0 mPa·s.

Comparative Example 3

Example 7 was selected from the compositions disclosed in WO 2010/089092 A. The reason is that the composition contains compound (3-1-1), compound (3-5-1), compound (4), compound (4-4-2), compound (4-6-1), compound (4-6-2), compound (4-7-1) and compound (4-8-2), and has the smallest rotation viscosity. Components and characteristics of the composition are as described below.

| | | |
|---|---|---|
| 3-BB(F,F)XB(F,F)-F | (4-8-2) | 8% |
| V-HHB(F)-F | (4-4) | 8% |
| 3-HHB(F,F)-F | (4-4-2) | 3% |
| 3-HBB(F,F)-F | (4-6-1) | 8.5% |
| 3-HB(F)B(F,F)-F | (4-6-2) | 8% |
| 3-BB(F)B(F,F)-F | (4-7-1) | 3.5% |
| 3-HHB(F)B(F,F)-F | (—) | 5% |
| V-HH-3 | (3-1-1) | 25% |
| 1V-HH-3 | (3-1-1) | 5% |
| V-HHB-1 | (3-5-1) | 13% |
| V2-HHB-1 | (3-5-1) | 12% |
| MAC-Np-MAC | (2-16-1) | 1% |

The composition obtained results in adding 1.01 parts by weight of second component of the invention to 100 parts by weight of composition excluding the second component of the invention.

NI=90.6° C.; Δn=0.101; Δ∈=6.5; γ1=66.0 mPa·s.

Comparative Example 4

Example M1 was selected from the compositions disclosed in JP 2011-525553 A. Components and characteristics of the composition are as described below.

| | | |
|---|---|---|
| 1V-HH-3 | (3-1-1) | 10% |
| V-HH-4 | (3-1-1) | 14% |
| V-HHB-1 | (3-5-1) | 15% |
| 3-BB(F,F)XB(F,F)-F | (4-8-2) | 18% |
| 3-HHXB(F,F)-F | (4-5-1) | 14% |
| 5-HHXB(F,F)-F | (4-5-1) | 4% |
| 3-HHB(F)B(F,F)-F | (—) | 3% |
| 2-BB(F)B-3 | (3-8-1) | 2% |
| 2-BB(F)B-4 | (3-8-1) | 4% |
| 3-HB(F)B(F,F)-F | (4-6-2) | 9% |
| 3-HHB(F,F)-F | (4-4-2) | 7% |

Then, 0.2 part by weight of the following compound (2-1-1) was added to 100 parts by weight of the composition.

| | |
|---|---|
| MAC-BB-MAC | (2-1-1) |

NI=80.0° C.; Δn=0.103; Δ∈=9.7; γ1=89.0 mPa·s.

Example 1

| | | |
|---|---|---|
| 3-HHB(F,F)XB(F,F)-F | (1-1-1) | 4% |
| 5-HHB(F,F)XB(F,F)-F | (1-1-1) | 4% |
| 3-HBBXB(F,F)-F | (1-2-1) | 8% |
| 5-BB(F,F)XB(F)B(F,F)-F | (1-4-1) | 7% |
| 5-BB(F)B(F)B(F,F)XB(F,F)-F | (1-7-1) | 3% |
| 5-BB(F)B(F,F)XB(F)B(F,F)-F | (1-10-2) | 7% |
| V-HH-3 | (3-1-1) | 42% |
| 1V-HH-3 | (3-1-1) | 6% |
| 3-HB-O2 | (3-2-1) | 6% |
| V2-BB-1 | (3-3-1) | 5% |
| V-HHB-1 | (3-5-1) | 8% |

Then, 0.3 part by weight of the following compound (2-1-1) was added to 100 parts by weight of the composition.

| | |
|---|---|
| MAC-BB-MAC | (2-1-1) |

NI=84.1° C.; Tc≤−20° C.; Δn=0.107; Δ∈=6.7; Vth=1.63 V; η=11.3 mPa·s; γ1=51.0 mPa·s; τ=21.6 ms; VHR-1=99.1%; VHR-2=97.9%; VHR-3=98.0%.

Example 2

| | | |
|---|---|---|
| 3-HBB(F,F)XB(F,F)-F | (1-2-3) | 6% |
| 3-HB(F)B(F,F)XB(F,F)-F | (1-2-4) | 4% |
| 4-BB(F)B(F,F)XB(F,F)-F | (1-3-1) | 7% |
| 5-BB(F)B(F,F)XB(F,F)-CF3 | (1-3-2) | 3% |
| V-HH-3 | (3-1-1) | 34% |
| V-HH-5 | (3-1-1) | 6% |
| 1V-HH-3 | (3-1-1) | 8% |
| 1V-HBB-2 | (3-6-1) | 3% |
| 3-BB(F)B-2V | (3-8-1) | 5% |
| 3-HHEBH-5 | (3-9-1) | 3% |
| 3-HHEBH(F,F)-F | (4) | 3% |
| 3-HHB(F,F)-F | (4-4-2) | 3% |
| 3-HHXB(F,F)-F | (4-5-1) | 6% |
| 3-BB(F,F)XB(F,F)-F | (4-8-2) | 9% |

Then, 0.5 part by weight of the following compound (2-1-1) was added to 100 parts by weight of the composition.

| | |
|---|---|
| MAC-BB-MAC | (2-1-1) |

NI=77.9° C.; Tc≤−20° C.; Δn=0.101; Δ∈=7.4; Vth=1.51 V; η=12.4 mPa·s; γ1=57.7 mPa·s; τ=22.7 ms; VHR-1=99.0%; VHR-2=98.1%; VHR-3=98.2%.

Example 3

| | | |
|---|---|---|
| 3-BB(F)B(F,F)XB(F,F)-F | (1-3-1) | 3% |
| 4-BB(F)B(F,F)XB(F,F)-F | (1-3-1) | 6% |
| 5-HHBB(F,F)XB(F,F)-F | (1-5-1) | 3% |
| 5-HHB(F,F)XB(F)B(F,F)-F | (1-8-1) | 3% |
| 3-BBB(F,F)XB(F)B(F,F)-F | (1-10-1) | 4% |
| 2-HH-3 | (3-1-1) | 5% |
| V-HH-3 | (3-1-1) | 39% |
| 1V-HH-3 | (3-1-1) | 5% |
| 5-B(F)BB-2 | (3-7-1) | 5% |
| 3-HB(F)HH-2 | (3-10-1) | 4% |
| 1V2-BB-CL | (4-3-1) | 4% |
| 3-HHB-CL | (4-4-1) | 3% |
| 3-HBB(F,F)-F | (4-6-1) | 4% |
| 3-BBXB(F,F)-F | (4-8-1) | 7% |
| 3-BB(F,F)XB(F,F)-F | (4-8-2) | 5% |

Then, 0.5 part by weight of the following compound (2-2-1) was added to 100 parts by weight of the composition.

| | |
|---|---|
| MAC-B(2F)B-MAC | (2-2-1) |

NI=77.9° C.; Tc≤−20° C.; Δn=0.111; Δ∈=6.4; Vth=1.68 V; η=12.2 mPa·s; γ1=57.0 mPa·s; τ=22.7 ms; VHR-1=99.1%; VHR-2=98.0%; VHR-3=97.9%.

Example 4

| | | |
|---|---|---|
| 5-HBBXB (F,F)-CF3 | (1-2-2) | 3% |
| 4-BB (F) B (F,F) XB (F,F)-F | (1-3-1) | 4% |
| 5-HBB (F) B (F,F) XB (F,F)-F | (1-6-2) | 3% |
| 5-HBB (F,F) XB (F) B (F,F)-F | (1-9-1) | 3% |
| 3-HH-4 | (3-1-1) | 3% |
| V-HH-3 | (3-1-1) | 42% |
| VFF-HHB-1 | (3-5) | 3% |
| 3-HHB-O1 | (3-5-1) | 3% |
| V2-HHB-1 | (3-5-1) | 6% |
| 2-B (F) BB-3 | (3-7-1) | 6% |
| 3-HB (F) B (F,F)-F | (4-6-2) | 7% |
| 3-BB (F) B (F,F)-F | (4-7-1) | 5% |
| 3-BB (F,F) XB (F,F)-F | (4-8-2) | 12% |

Then, 0.8 part by weight of the following compound (2-3-1) was added to 100 parts by weight of the composition.

| | |
|---|---|
| MAC-B (F) B-MAC | (2-3-1) |

NI=74.4° C.; Tc≤−20° C.; Δn=0.107; Δ∈=6.5; Vth=1.68 V; η=13.1 mPa·s; γ1=59.9 mPa·s; τ=23.3 ms; VHR-1=99.1%; VHR-2=98.1%; VHR-3=98.2%.

Example 5

| | | |
|---|---|---|
| 4-BE (F) B (F,F) XB (F,F)-F | (1-3-1) | 8% |
| 5-BB (F) B (F,F) XB (F,F)-F | (1-3-1) | 4% |
| 5-HBBB (F,F) XB (F,F)-F | (1-6-1) | 3% |
| 5-BB (F) B (F,F) XB (F) B (F,F)-F | (1-10-2) | 3% |
| V-HH-3 | (3-1-1) | 38% |

| | | |
|---|---|---|
| 1V-HH-3 | (3-1-1) | 7% |
| 7-HB-1 | (3-2-1) | 4% |
| 1V2-BB-1 | (3-3-1) | 4% |
| V-HHB-1 | (3-5-1) | 8% |
| 3-HBB-2 | (3-6-1) | 3% |
| 5-HB (F) BH-3 | (3-12-1) | 3% |
| 3-BB (F) B (F,F)-F | (4-7-1) | 10% |
| 3-BB (F,F) XB (F)-OCF3 | (4-8-3) | 5% |

Then, 0.3 part by weight of the following compound (2-18-1) was added to 100 parts by weight of the composition.

| | |
|---|---|
| MAC-BB (F) B-MAC | (2-18-1) |

NI=78.1° C.; Tc≤−20° C.; Δn=0.114; Δ∈=6.3; Vth=1.70 V; η=12.8 mPa·s; γ1=59.4 mPa·s; τ=23.1 ms; VHR-1=99.0%; VHR-2=97.9%; VHR-3=98.0%.

Example 6

| | | |
|---|---|---|
| 3-HBBXB (F,F)-F | (1-2-1) | 10% |
| 3-BB (F) B (F,F) XB (F,F)-F | (1-3-1) | 2% |
| 4-BB (F) B (F,F)XB (F,F)-F | (1-3-1) | 7% |
| 5-BB (F) B (F,F) XB (F,F)-F | (1-3-1) | 4% |
| 3-BB (F) B (F,F) XB (F) B (F,F)-F | (1-10-2) | 3% |
| 3-HH-VFF | (3-1) | 5% |
| V-HH-3 | (3-1-1) | 40% |
| 1V-HH-3 | (3-1-1) | 4% |
| V2-HHB-1 | (3-5-1) | 8% |
| 5-HBBH-3 | (3-11-1) | 3% |
| 3-HB-CL | (4-1-1) | 4% |
| 3-BB (F,F) XB (F,F)-F | (4-8-2) | 10% |

Then, 0.3 part by weight of the following compound (2-23-1) was added to 100 parts by weight of the composition.

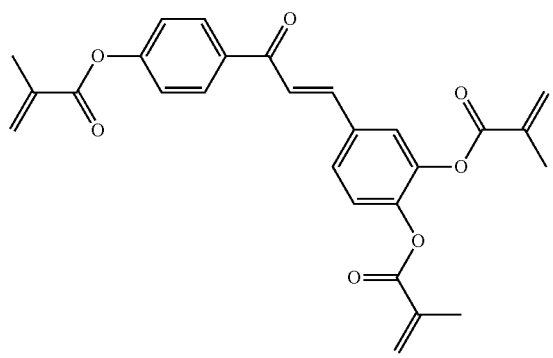 [SMILES: C=C(C)C(=O)Oc1ccc(C(=O)/C=C/c2ccc(OC(=O)C(=C)C)c(OC(=O)C(=C)C)c2)cc1]

NI=79.8° C.; Tc≤−20° C.; Δn=0.104; Δ∈=7.3; Vth=1.54 V; η=11.1 mPa·s; γ1=51.4 mPa·s; τ=21.3 ms; VHR-1=99.1%; VHR-2=98.0%; VHR-3=98.2%.

Example 7

| | | |
|---|---|---|
| 3-HBB (F,F) XB (F,F)-F | (1-2-3) | 10% |
| 4-BB (F) B (F,F) XB (F,F)-F | (1-3-1) | 7% |
| 5-BB (F) B (F,F) XB (F,F)-F | (1-3-1) | 4% |
| 3-HH-O1 | (3-1) | 3% |
| V-HH-3 | (3-1-1) | 40% |
| 1V-HH-3 | (3-1-1) | 5% |
| V-HHB-1 | (3-5-1) | 5% |
| 1-BB (F) B-2V | (3-8-1) | 5% |
| 5-HBB (F) B-2 | (3-13-1) | 4% |
| 3-HXB (F,F)-F | (4-2-1) | 4% |
| 3-HHXB (F,F)-CF3 | (4-5-2) | 6% |
| 3-BB (F,F) XB (F,F)-F | (4-8-2) | 7% |

Then, 0.5 part by weight of the following compound (2-1-1) was added to 100 parts by weight of the composition.

| | |
|---|---|
| MAC-VO-BB-MAC | (2-1-1) |

NI=75.5° C.; Tc≤−20° C.; Δn=0.105; Δ∈=6.7; Vth=1.63 V; η=13.0 mPa·s; γ1=59.2 mPa·s; τ=23.3 ms; VHR-1=99.1%; VHR-2=97.9%; VHR-3=98.2%.

Example 8

| | | |
|---|---|---|
| 5-HB (F) B (F,F) XB (F,F)-F | (1-2-4) | 5% |
| 3-BB (F) B (F,F) XB (F,F)-F | (1-3-1) | 2% |
| 4-BB (F) B (F,F) XB (F,F)-F | (1-3-1) | 7% |
| 5-BB (F) B (F,F) XB (F,F)-F | (1-3-1) | 4% |
| V-HH-3 | (3-1-1) | 41% |
| 1V-HH-3 | (3-1-1) | 7% |
| 3-HHEH-5 | (3-4-1) | 3% |
| 3-HHB-1 | (3-5-1) | 4% |
| V2-HHB-1 | (3-5-1) | 5% |
| V2-BB (F) B-1 | (3-8-1) | 5% |
| 1V2-BB-F | (4-3-2) | 3% |
| 3-BB (F,F) XB (F,F)-F | (4-8-2) | 11% |
| 3-HHBB (F,F)-F | (—) | 3% |

Then, 0.5 part by weight of the following compound (2-1-1) was added to 100 parts by weight of the composition.

| | |
|---|---|
| MAC-V-BB-MAC | (2-1-1) |

NI=82.2° C.; Tc≤−20° C.; Δn=0.106; Δ∈=6.3; Vth=1.69 V; η=11.8 mPa·s; γ1=55.8 mPa·s; τ=22.0 ms; VHR-1=99.0%; VHR-2=98.1%; VHR-3=98.1%.

Example 9

| | | |
|---|---|---|
| 3-HHB (F,F) XB (F,F)-F | (1-1-1) | 4% |
| 5-HHB (F,F) XB (F,F)-F | (1-1-1) | 4% |
| 3-HBBXB (F,F)-F | (1-2-1) | 8% |
| 5-BB (F,F) XB (F) B (F,F)-F | (1-4-1) | 7% |
| 5-BB (F) B (F) B (F,F) XB (F,F)-F | (1-7-1) | 3% |
| 5-BB (F) B (F,F) XB (F) B (F,F)-F | (1-10-2) | 7% |
| V-HH-3 | (3-1-1) | 42% |
| 1V-HH-3 | (3-1-1) | 6% |
| 3-HB-O2 | (3-2-1) | 6% |
| V2-BB-1 | (3-3-1) | 5% |
| V-HHB-1 | (3-5-1) | 8% |

Then, 0.3 part by weight of the following compound (2-1-1) was added to 100 parts by weight of the composition.

| | |
|---|---|
| MAC-BB-AC | (2-1-1) |

NI=84.0° C.; Tc≤−20° C.; Δn=0.107; Δ∈=6.7; Vth=1.63 V; η=11.3 mPa·s; γ1=51.2 mPa·s; τ=21.6 ms; VHR-1=99.0%; VHR-2=98.0%; VHR-3=97.9%.

Example 10

| | | |
|---|---|---|
| 4-BB (F) B (F,F) XB (F,F)-F | (1-3-1) | 8% |
| 5-BB (F) B (F,F) XB (F,F)-F | (1-3-1) | 4% |
| 5-HBBB (F,F) XB (F,F)-F | (1-6-1) | 3% |
| 5-BB (F) B (F,F) XB (F) B (F,F)-F | (1-10-2) | 3% |
| V-HH-3 | (3-1-1) | 38% |
| 1V-HH-3 | (3-1-1) | 7% |
| 7-HB-1 | (3-2-1) | 4% |
| 1V2-BB-1 | (3-3-1) | 4% |
| V-HHB-1 | (3-5-1) | 8% |
| 3-HBB-2 | (3-6-1) | 3% |
| 5-HB (F) BH-3 | (3-12-1) | 3% |
| 3-BB (F) B (F,F)-F | (4-7-1) | 10% |
| 3-BB (F,F) XB (F)-OCF3 | (4-8-3) | 5% |

Then, 0.4 part by weight of the following compound (2-1-1) was added to 100 parts by weight of the composition.

| | | |
|---|---|---|
| AC-VO-BB-MAC | (2-1-1) | |

NI=78.0° C.; Tc≤−20° C.; Δn=0.114; Δ∈=6.3; Vth=1.70 V; η=12.7 mPa·s; γ1=59.3 mPa·s; τ=23.1 ms; VHR-1=98.9%; VHR-2=98.0%; VHR-3=98.0%.

Example 11

| | | |
|---|---|---|
| 5-HBBXB (F,F)-CF3 | (1-2-2) | 3% |
| 4-BB (F) B (F,F) XB (F,F)-F | (1-3-1) | 4% |

-continued

| | | |
|---|---|---|
| 5-HBB (F) B (F,F) XB (F,F)-F | (1-6-2) | 3% |
| 5-HBB (F,F) XB (F) B (F,F)-F | (1-9-1) | 3% |
| 3-HH-4 | (3-1-1) | 3% |
| V-HH-3 | (3-1-1) | 42% |
| VFF-HHB-1 | (3-5) | 3% |
| 3-HHB-O1 | (3-5-1) | 3% |
| V2-HHB-1 | (3-5-1) | 6% |
| 2-B (F) BB-3 | (3-7-1) | 6% |
| 3-HB (F) B (F,F)-F | (4-6-2) | 7% |
| 3-BB (F) B (F,F)-F | (4-7-1) | 5% |
| 3-BB (F,F) XB (F,F)-F | (4-8-2) | 12% |

Then, 0.3 part by weight of the following compound (2-18-1) was added to 100 parts by weight of the composition.

| | | |
|---|---|---|
| MAC-BB (F) B-OV-MAC | (2-18-1) | |

NI=74.5° C.; Tc≤−20° C.; Δn=0.108; Δ∈=6.5; Vth=1.70 V; η=12.9 mPa·s; γ1=59.4 mPa·s; τ=23.1 ms; VHR-1=99.1%; VHR-2=98.1%; VHR-3=98.1%.

The compositions in Example 1 to Example 11 have a smaller rotation viscosity, compared with the compositions in Comparative Example 1 to Comparative Example 4. Thus, the liquid crystal composition according to the invention is so much superior in characteristics to the composition shown in Patent literature No. 1 to Patent literature No. 2.

Industrial Applicability

The invention concerns a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light and a high stability to heat, or a liquid crystal composition having a suitable balance regarding at least two of the characteristics. A liquid crystal display device including such a composition is applied to constitute an AM device having a short response time, a suitable pretilt, a large voltage holding ratio, a large contrast ratio, a long service life and so forth, and thus can be used for a liquid crystal projector, a liquid crystal television and so forth.

What is claimed is:

1. A liquid crystal composition, having a nematic phase and containing at least one compound selected from the group of compounds represented by formula (1) as a first component and at least one polymerizable compound selected from the group of compounds represented by formula (2) as a second component, and having a ratio of the first component in the range of 5% by weight to 40% by weight based on the weight of the liquid crystal composition excluding the second component:

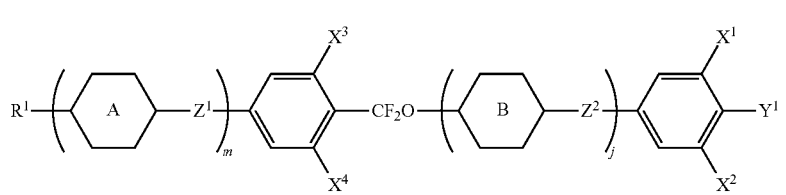

(1)

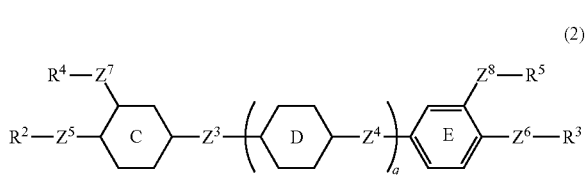

(2)

wherein $R^1$ is alkyl having 1 to 12 carbons, alkoxy having 1 to 12 carbons or alkenyl having 2 to 12 carbons; $R^2$, $R^3$, $R^4$ and $R^5$ are independently hydrogen, alkyl having 1 to 12 carbons, alkoxy having 1 to 12 carbons, alkenyl having 2 to 12 carbons, alkenyl having 2 to 12 carbons in which at least one of hydrogen is replaced by fluorine, acryloyl, methacryloyl, vinyloxy, propenyloxy, oxirane, oxetane or vinylcarbonyl, and at least one of $R^2$, $R^3$, $R^4$ and $R^5$ is acryloyl, methacryloyl, oxirane, or oxetane; ring A and ring B are independently 1,4-cyclohexylene, 1,4-phenylene, 2-fluoro-1,4-phenylene, 3-fluoro-1,4-phenylene, 3,5-difluoro-1,4-phenylene, pyrimidine-2,5- diyl or 2,6,7-trioxabicyclo[2.2.2]octane-1,4-diyl; ring C, ring D and ring E are independently 1,4-cyclohexylene, 1,4-phenylene, 2-fluoro-1,4-phenylene, 3-fluoro-1,4-phenylene, 2,3-difluoro- 1,4-phenylene, 2-methyl-1,4-phenylene, 3-methyl-1,4-phenylene, 2-trifluoromethyl-1,4-phenylene, 3 -trifluoromethyl-1, 4-phenylene or 2,6-naphthalene; $Z^1$ and $Z^2$ are independently a single bond, ethylene, carbonyloxy or difluoromethyleneoxy; $Z^3$ is a single bond, ethylene, methyleneoxy, carbonyloxy, —CO—CR$^6$=CR$^7$—, —CR$^6$=CR$^7$—CO—, —CR$^6$=CR$^7$—, —C(=CR$^6$R$^7$)—or —C(=R$^8$)—; R$^6$ and R$^7$ are independently hydrogen, halogen, alkyl having 1 to 10 carbons, or alkyl having 1 to 10 carbons in which at least one of halogene is replaced by fluorine; and R$^8$ is a group selected from the group of groups represented by formula (R-1);

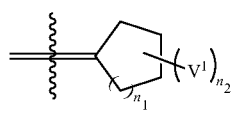

(R-1)

wherein $V^1$ is independently halogen, alkyl having 1 to 6 carbons, or alkyl having 1 to 6 carbons in which at least one of hydrogen is replaced by fluorine; $n_1$ is an integer from 1 to 8; $n_2$ is an integer from 0 to 4; $Z^4$ is independently a single bond, ethylene, methyleneoxy or carbonyloxy; $Z^5$, $Z^6$, $Z^7$ and $Z^8$ are independently a single bond or alkylene having 1 to 12 carbons, at least one of hydrogen of the alkylene may be replaced by halogen or —C≡N, at least one of non-adjacent —CH$_2$—may be replaced by —O—, —S—, —NH—, —CO—, —CO—O—, —O—CO—, —O—CO—O—, —ch=ch—OR—C≡C—; $X^1$, $X^2$, $X^3$ and $X^4$ are independently hydrogen or fluorine; $Y^1$ is fluorine, chlorine, trifluoromethyl or trifluoromethoxy; and m and j are independently 0, 1, 2 or 3, and a sum of m and j is 2 or 3; and q is 0, 1 or 2.

2. The liquid crystal composition according to claim 1, wherein the first component is at least one compound selected from the group of compounds represented by formula (1-1) to formula (1-10):

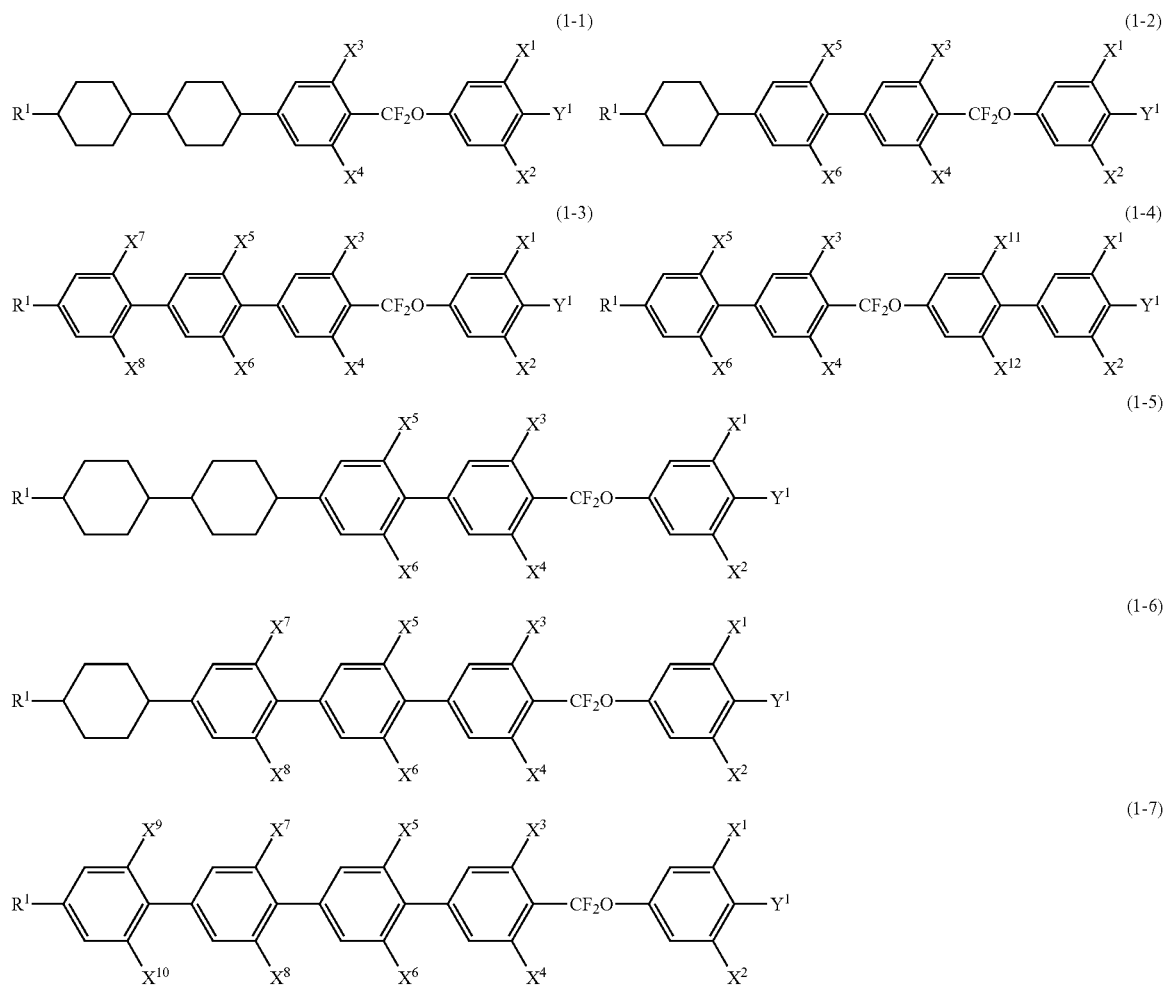

-continued

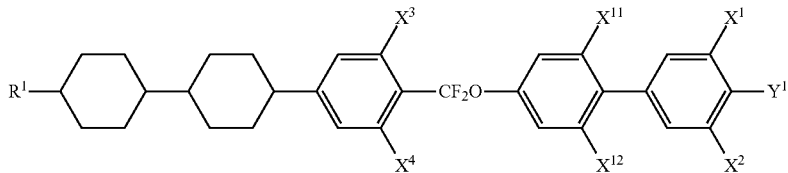
(1-8)

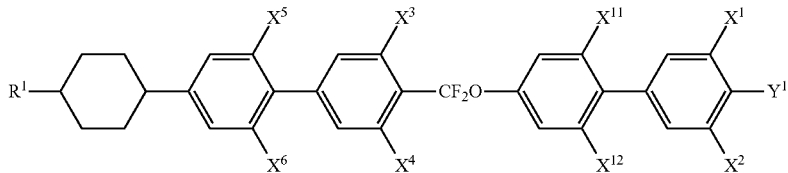
(1-9)

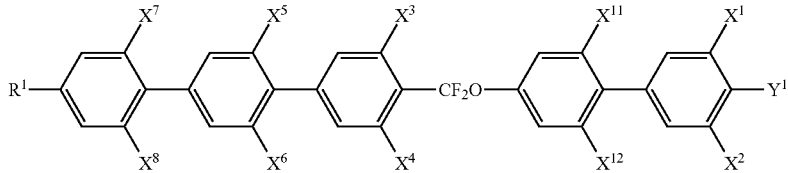
(1-10)

wherein $R^1$ is alkyl having 1 to 12 carbons, alkoxy having 1 to 12 carbons or alkenyl having 2 to 12 carbons; $X^1$, $X_2$, $X^3$, $X^4$, $X^5$, $X^6$, $X^7$, $X^8$, $X^9$, $X^{10}$, $X^{11}$ and $X^{12}$ are independently hydrogen or fluorine; and $Y^1$ is fluorine, chlorine, trifluoromethyl or trifluoromethoxy.

3. The liquid crystal composition according to claim 1, wherein the first component is at least one compound selected from the group of compounds represented by formula (1-3):

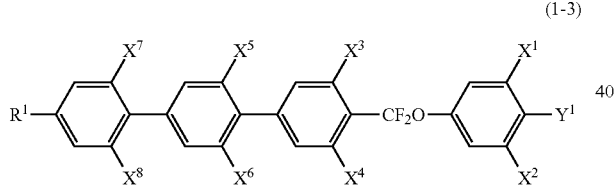
(1-3)

wherein $R^1$ is alkyl having 1 to 12 carbons, alkoxy having 1 to 12 carbons or alkenyl having 2 to 12 carbons; $X^1$, $X^2$, $X^3$, $X^4$, $X^5$, $X^6$, $X^7$ and $X^8$ are independently hydrogen or fluorine; and $Y^1$ is fluorine, chlorine, trifluoromethyl or trifluoromethoxy.

4. The liquid crystal composition according to claim 1, wherein the second component is at least one compound selected from the group of compounds represented by formula (2-1) to formula (2-26):

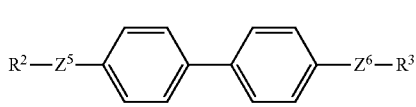
(2-1)

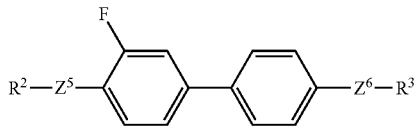
(2-2)

-continued

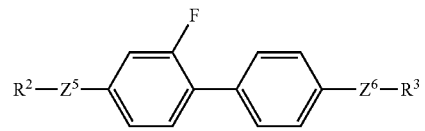
(2-3)

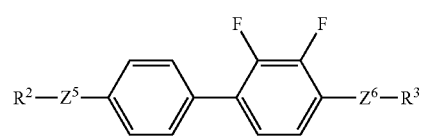
(2-4)

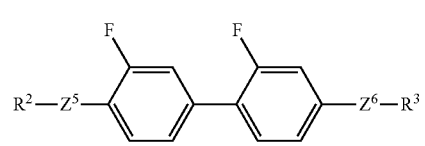
(2-5)

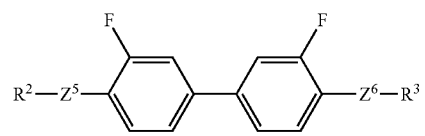
(2-6)

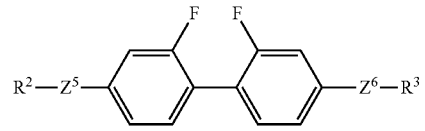
(2-7)

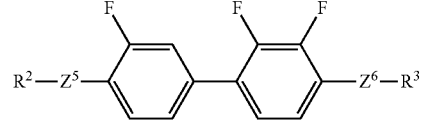
(2-8)

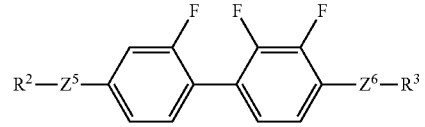
(2-9)

-continued

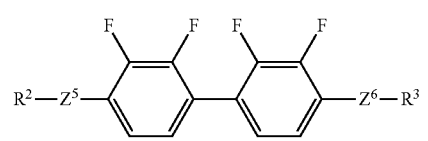 (2-10)

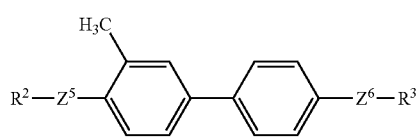 (2-11)

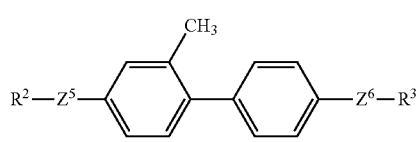 (2-12)

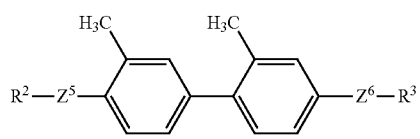 (2-13)

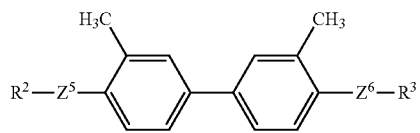 (2-14)

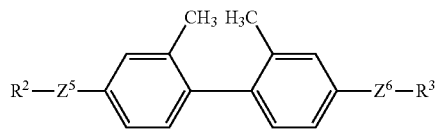 (2-15)

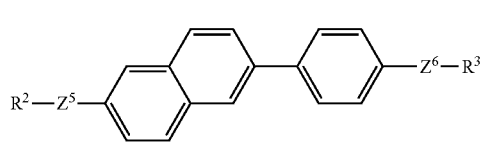 (2-16)

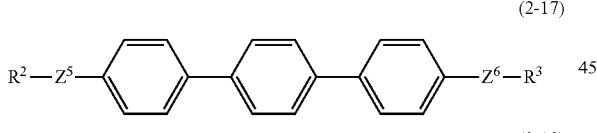 (2-17)

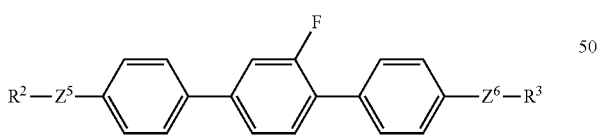 (2-18)

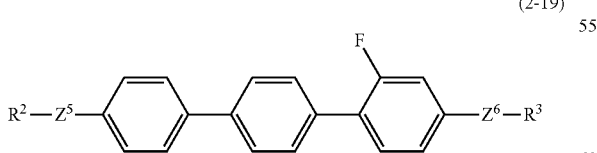 (2-19)

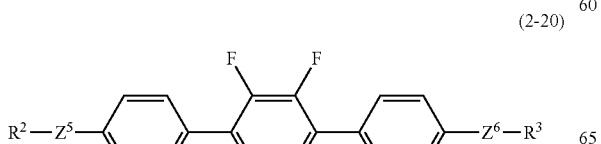 (2-20)

-continued

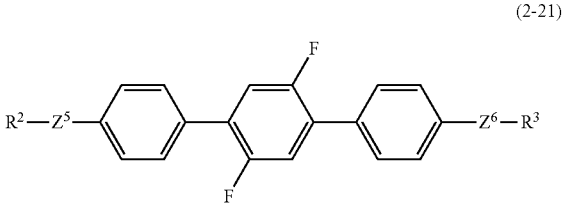 (2-21)

 (2-22)

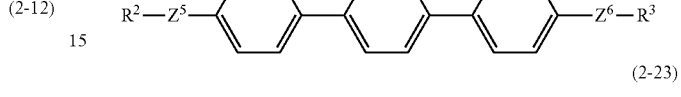 (2-23)

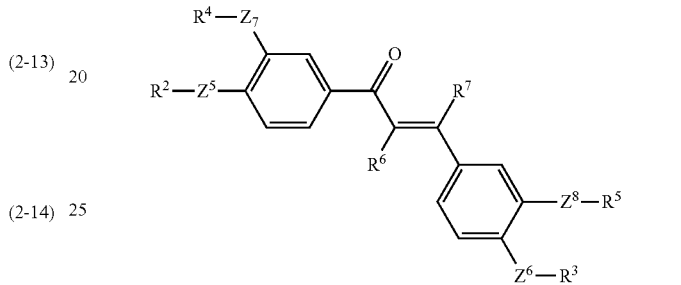 (2-24)

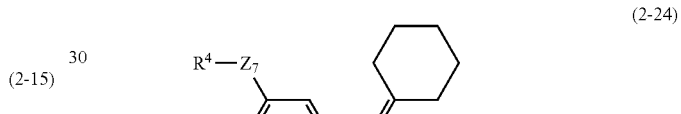 (2-25)

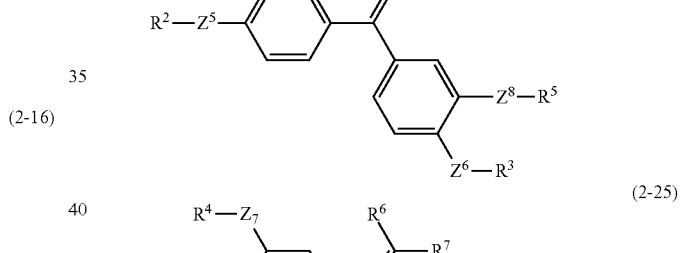 (2-26)

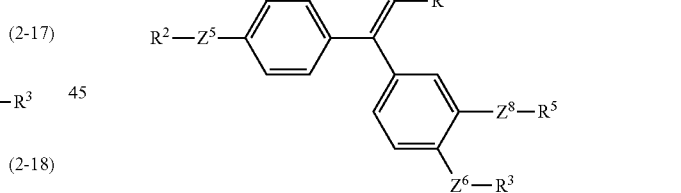

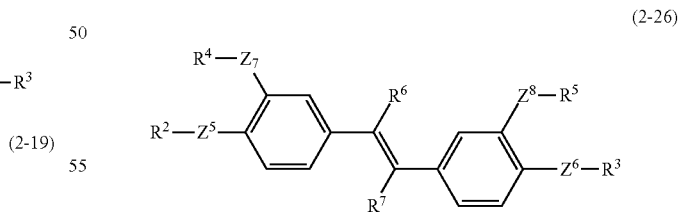

wherein $R^2$, $R^3$, $R^4$ and $R^5$ are independently hydrogen, alkyl having 1 to 12 carbons, alkoxy having 1 to 12 carbons, alkenyl having 2 to 12 carbons, alkenyl having 2 to 12 carbons in which at least one of hydrogen is replaced by fluorine, acryloyl, methacryloyl, vinyloxy, propenyloxy, oxirane, oxetane or vinylcarbonyl, at least one of $R^2$, $R^3$, $R^4$ and $R^5$ is acryloyl, methacryloyl, oxirane, or oxetane, and $R^6$ and $R^7$ are independently hydrogen, halogen, alkyl having 1 to 10 carbons, or alkyl having 1 to 10 carbons in which at least one of hydrogen is replaced by fluorine; $Z^5$, $Z^6$, $Z^7$ and $Z^8$ are independently a single bond or alkylene having 1 to 12 carbons, at least one of hydrogen of the alkylene may be replaced by halogen or —C≡N, and at least one of non-adjacent —CH$_2$— may be replaced by —O—, —S—, —NH—, —CO—, —CO—O—, —O—CO—, —O—CO—O—, —CH═CH— or —C≡C—.

5. The liquid crystal composition according to claim 1, wherein a ratio of the second component is in the range of 0.05 part by weight to 10 parts by weight based on 100 parts by weight of the liquid crystal composition excluding the second component.

6. The liquid crystal composition according to claim 1, further containing at least one compound selected from the group of compounds represented by formula (3) as a third component:

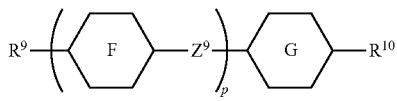
(3)

wherein $R^9$ and $R^{10}$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring F and ring G are independently 1,4-cyclohexylene, 1,4-phenylene, 2-fluoro-1,4-phenylene, 3-fluoro-1,4-phenylene or 2,5-difluoro-1,4-phenylene; $Z^9$ is independently a single bond, ethylene, methyleneoxy or carbonyloxy; and p is 1, 2 or 3.

7. The liquid crystal composition according to claim 6, wherein the third component is at least one compound selected from the group of compounds represented by formula (3-1) to (3-13):

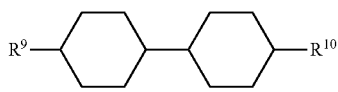
(3-1)

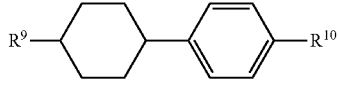
(3-2)

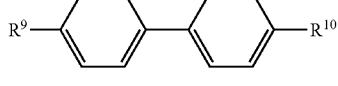
(3-3)

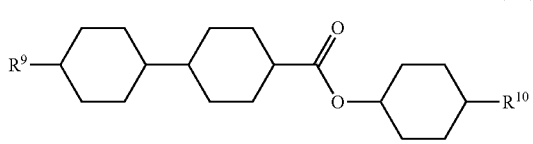
(3-4)

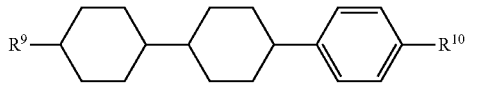
(3-5)

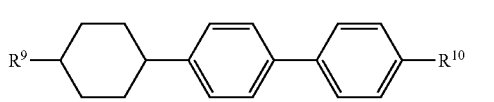
(3-6)

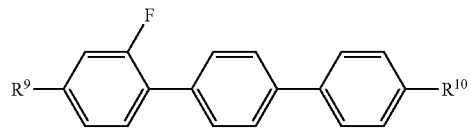
(3-7)

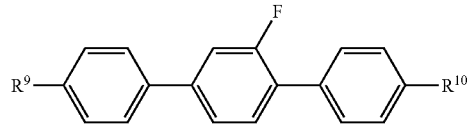
(3-8)

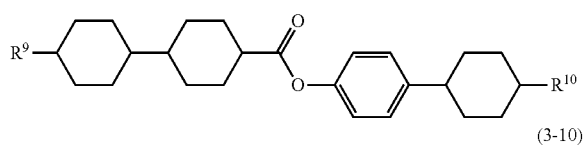
(3-9)

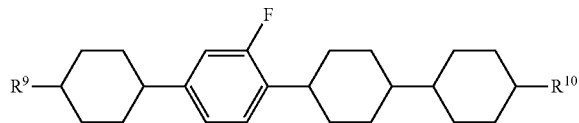
(3-10)

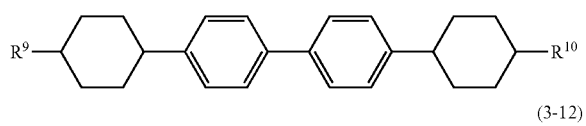
(3-11)

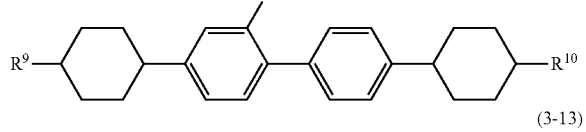
(3-12)

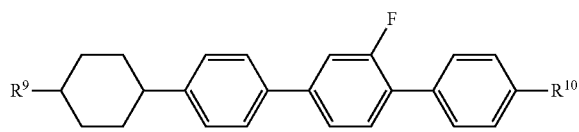
(3-13)

wherein $R^9$ and $R^{10}$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

8. The liquid crystal composition according to claim 6, wherein a ratio of the third component is in the range of 10% by weight to 95% by weight based on the weight of the liquid crystal composition excluding the second component.

9. The liquid crystal composition according to claim 1, further containing at least one compound selected from the group of compounds represented by formula (4) as a fourth component:

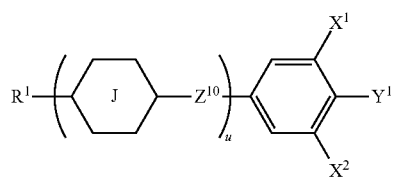
(4)

wherein $R^1$ is alkyl having 1 to 12 carbons, alkoxy having 1 to 12 carbons or an alkenyl having 2 to 12 carbons; ring J is independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl or 2,6,7-trioxabicyclo[2.2.2]-octane-1,4-diyl; $Z^{10}$ is independently a single bond, ethylene, carbonyloxy or difluoromethyleneoxy; $X^1$ and $X^2$ are independently hydrogen or fluorine; $Y^1$ is fluorine, chlorine, trifluoromethyl or trifluoromethoxy; and u is 1 or 2.

10. The liquid crystal composition according to claim 9, wherein the fourth component is at least one compound selected from the group of compounds represented by formula (4-1) to formula (4-8):

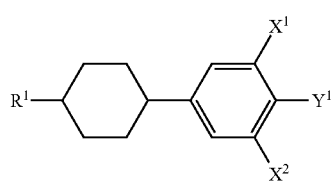 (4-1)

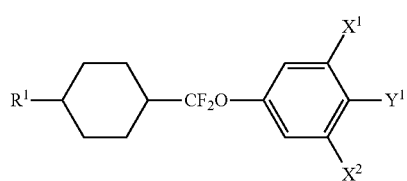 (4-2)

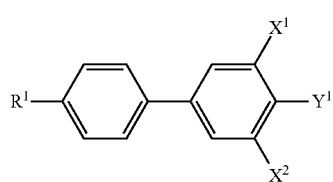 (4-3)

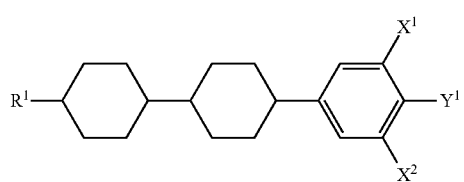 (4-4)

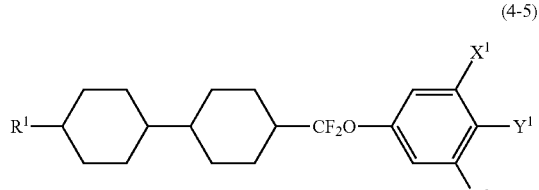 (4-5)

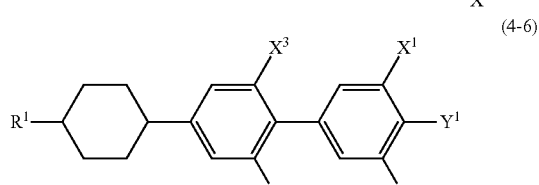 (4-6)

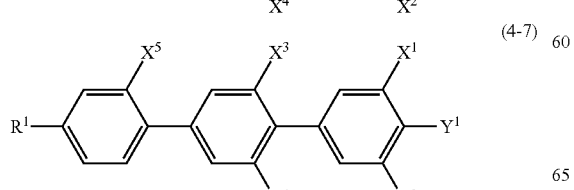 (4-7)

-continued

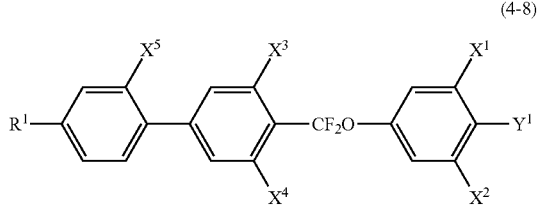 (4-8)

wherein $R^1$ is alkyl having 1 to 12 carbons, alkoxy having 1 to 12 carbons or alkenyl having 2 to 12 carbons; $X^1$, $X^2$, $X^3$, $X^4$ and $X^5$ are independently hydrogen or fluorine; and $Y^1$ is fluorine, chlorine, trifluoromethyl or trifluoromethoxy.

11. The liquid crystal composition according to claim 9, wherein a ratio of the fourth component is in the range of 5% by weight to 40% by weight based on the weight of the liquid crystal composition excluding the second component.

12. The liquid crystal composition according to claim 1, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is 2 or more.

13. A liquid crystal display device having a polymer sustained alignment (PSA) mode, comprising two substrates having an electrode layer on at least one of the substrates, and arranging between the two substrates a liquid crystal material containing a compound obtained by polymerizing a polymerizable compound in the liquid crystal composition according to claim 1.

14. The liquid crystal display device according to claim 13, wherein an operating mode of the liquid crystal display device is a TN mode, an OCB mode, an IPS mode or an FFS mode, and a driving mode of the liquid crystal display device is an active matrix mode.

15. A method for manufacturing the liquid crystal display device, comprising polymerizing a polymerizable compound by optically irradiating the liquid crystal composition according to claim 1 as arranged between two substrates in a state of voltage application.

16. The liquid crystal composition according to claim 6, further containing at least one compound selected from the group of compounds represented by formula (4) as a fourth component:

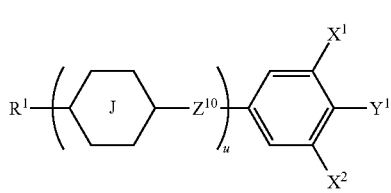 (4)

wherein $R^1$ is alkyl having 1 to 12 carbons, alkoxy having 1 to 12 carbons or an alkenyl having 2 to 12 carbons; ring J is independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl or 2,6,7-trioxabicyclo[2.2.2]-octane-1,4-diyl; $Z^{10}$ is independently a single bond, ethylene, carbonyloxy or difluoromethyleneoxy; $X^1$ and $X^2$ are independently hydrogen or fluorine; $Y^1$ is fluorine, chlorine, trifluoromethyl or trifluoromethoxy; and u is 1 or 2.

17. The liquid crystal composition according to claim 16, wherein the fourth component is at least one compound selected from the group of compounds represented by formula (4-1) to formula (4-8):

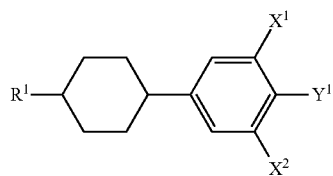 (4-1)

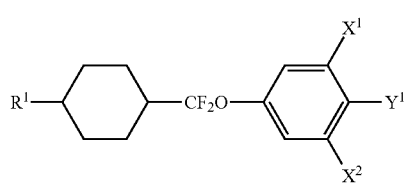 (4-2)

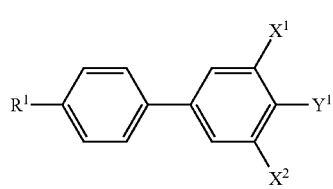 (4-3)

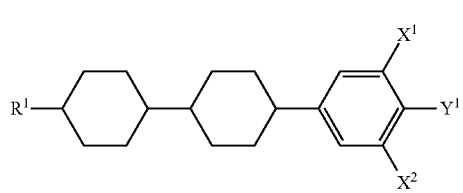 (4-4)

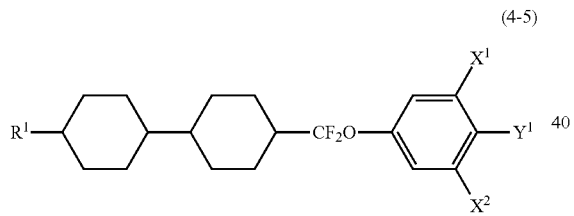 (4-5)

-continued

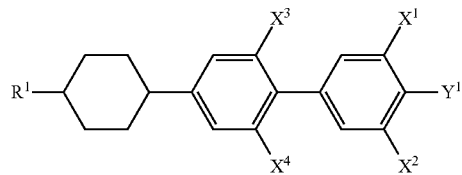 (4-6)

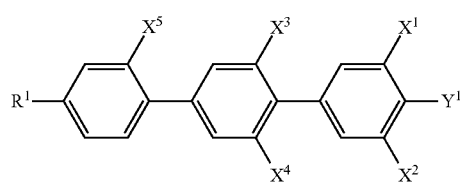 (4-7)

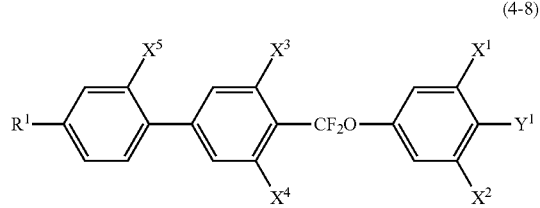 (4-8)

wherein $R^1$ is alkyl having 1 to 12 carbons, alkoxy having 1 to 12 carbons or alkenyl having 2 to 12 carbons; $X^1$, $X^2$, $X^3$, $X^4$ and $X^5$ are independently hydrogen or fluorine; and $Y^1$ is fluorine, chlorine, trifluoromethyl or trifluoromethoxy.

18. The liquid crystal composition according to claim 16, wherein a ratio of the fourth component is in the range of 5% by weight to 40% by weight based on the weight of the liquid crystal composition excluding the second component.

* * * * *